May 22, 1951 I. MOLNAR 2,554,115

AUTOMATIC DIRECTOR TELEPHONE SYSTEM

Filed Dec. 8, 1947 9 Sheets-Sheet 1

*INVENTOR.*
IMRE MOLNAR

*BY* Chas. W. Cassidy

ATTORNEY

AUTOMATIC DIRECTOR TELEPHONE SYSTEM

Filed Dec. 8, 1947 9 Sheets-Sheet 2

| TO / FROM | C (79) | Q (78) | J (77) | P (81) | A (66) | S (65) |
|---|---|---|---|---|---|---|
| C (79) | - | 8 | 1 | 16 | 166 | 1665 |
| Q (78) | 9 | - | 1 | 16 | 166 | 1665 |
| J (77) | 9 | 8 | - | 6 | 66 | 665 |
| P (81) * | 79 | 78 | 77 | - | 66 | 65 |
| A (66) | 179 | 178 | 17 | 1 | - | 5 |
| S (65) | 1179 | 1178 | 117 | 11 | 1 | - |

* DIALLED DIGITS - NO TRANSLATION

INVENTOR.
IMRE MOLNAR
BY
Chas. Mc Candy
ATTORNEY

AUTOMATIC DIRECTOR TELEPHONE SYSTEM

Filed Dec. 8, 1947 9 Sheets-Sheet 3

INVENTOR.
IMRE MOLNAR

BY [signature]

ATTORNEY

May 22, 1951 I. MOLNAR 2,554,115

AUTOMATIC DIRECTOR TELEPHONE SYSTEM

Filed Dec. 8, 1947 9 Sheets-Sheet 4

*INVENTOR.*
IMRE MOLNAR

*BY*

ATTORNEY

AUTOMATIC DIRECTOR TELEPHONE SYSTEM

Filed Dec. 8, 1947 9 Sheets-Sheet 5

INVENTOR.
IMRE MOLNAR

BY [signature]

ATTORNEY

AUTOMATIC DIRECTOR TELEPHONE SYSTEM

Filed Dec. 8, 1947 9 Sheets-Sheet 6

INVENTOR.
IMRE MOLNAR
BY
ATTORNEY

AUTOMATIC DIRECTOR TELEPHONE SYSTEM

INVENTOR.
IMRE MOLNAR

BY

Chas. Tr. Coaly

ATTORNEY

AUTOMATIC DIRECTOR TELEPHONE SYSTEM

Filed Dec. 8, 1947 9 Sheets-Sheet 8

INVENTOR.
IMRE MOLNAR
BY
Chas. Wm. Cardy
ATTORNEY

May 22, 1951 I. MOLNAR 2,554,115

AUTOMATIC DIRECTOR TELEPHONE SYSTEM

Filed Dec. 8, 1947 9 Sheets-Sheet 9

*INVENTOR.*
IMRE MOLNAR

*BY* [signature]

ATTORNEY

Patented May 22, 1951 2,554,115

UNITED STATES PATENT OFFICE 2,554,115

AUTOMATIC DIRECTOR TELEPHONE SYSTEM

Imre Molnar, Chicago, Ill., assignor to Automatic Electric Laboratories, Inc., Chicago, Ill., a corporation of Delaware Application December 8, 1947, Serial No. 790,328

23 Claims. (Cl. 179—18)

The present invention relates to telephone systems, and particularly to multi-office universal numbering systems of the step-by-step type in which translating register-senders, commonly known as directors are employed for routing calls. Such register senders are particularly useful in large networks to eliminate the need for trunking from each office to every other office and promote greater trunk efficiency, by registering the digits of a call number and re-transmitting the same or different digits in greater or lesser number to route the call to the desired office by the quickest route in accordance with the location of the originating office.

The main object of my invention is the provision of a simple and low cost director arrangement for use in small networks in which the various offices are too far apart for direct connections, but must be trunked together in tandem. One application for such a director arrangement is for a private system for an oil or mining concern, in which fast communication is desired between a number of scattered private exchanges.

One feature of the invention is accordingly the use of an all relay director-selector which, instead of being individual to the selectors, is common to all of the selectors and directors in the office.

Another feature of the invention is the use of a coding office register responsive to only a single office selecting digit for setting up the different outgoing office codes.

A further feature of the invention is the re-use of the office register as a line digit register. This is done by operating a small group of coding relays in various combinations from the office register, locking up the operated relays and then releasing the register, which is provided with two banks for the double use.

Still another feature of the invention is the inclusion of a restricting relay with the coding relays and then operating said relay from certain calling lines, or from certain positions of said office register corresponding to an unused office digit, for cancelling an existing code set-up and substituting a different code for directing the call to a special number.

Another feature is the use of a relay interrupter individual to each director for generating the outgoing pulses.

Other objects and features of the invention will be apparent from the specification and claims which follow, when considered in conjunction with the accompanying drawings comprising Figures 1 to 11 inclusive.

Figure 1 shows a small telephone network comprising telephone exchanges C, Q, J, P, A, and S.

Figures 2 and 3 diagrammatically illustrate the trunking arrangement and the necessary apparatus for this telephone network.

Figures 4 to 10, inclusive, show some of the apparatus at exchange J in detail circuit diagrams.

Figure 4 for example illustrates the subscribers' lines C and C', the rotary line switches RLS, the first selector FS, the incoming selector IS1, and the connector CS, in diagrammatic form, and the second selector SS in a detail circuit digram.

Figure 5 diagrammatically illustrates an all-relay director-finder DF for interconnecting the second selectors, such as SS, with idle ones of the directors, DR.

Figures 1, 2:
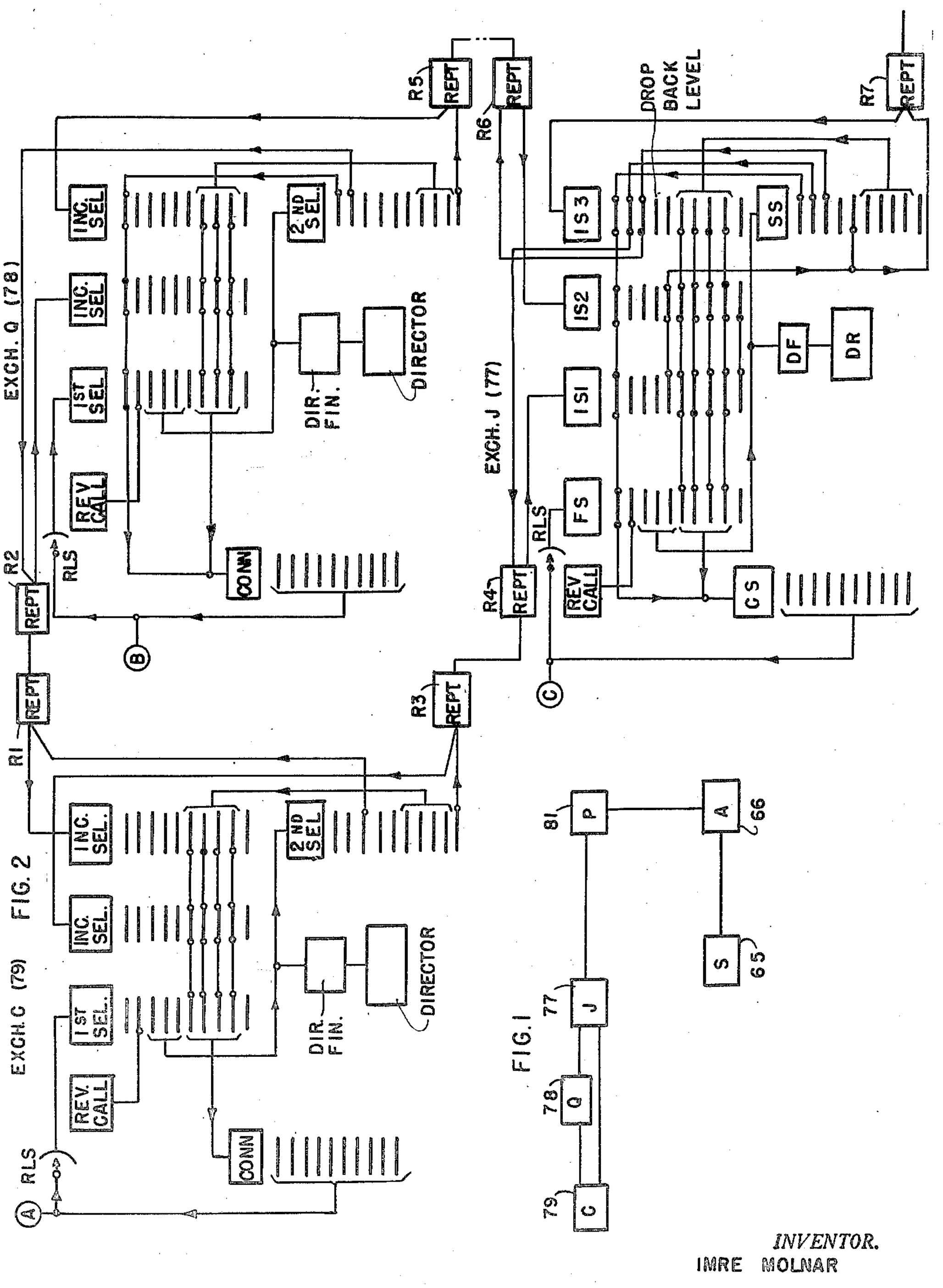
Figures 3, 11:
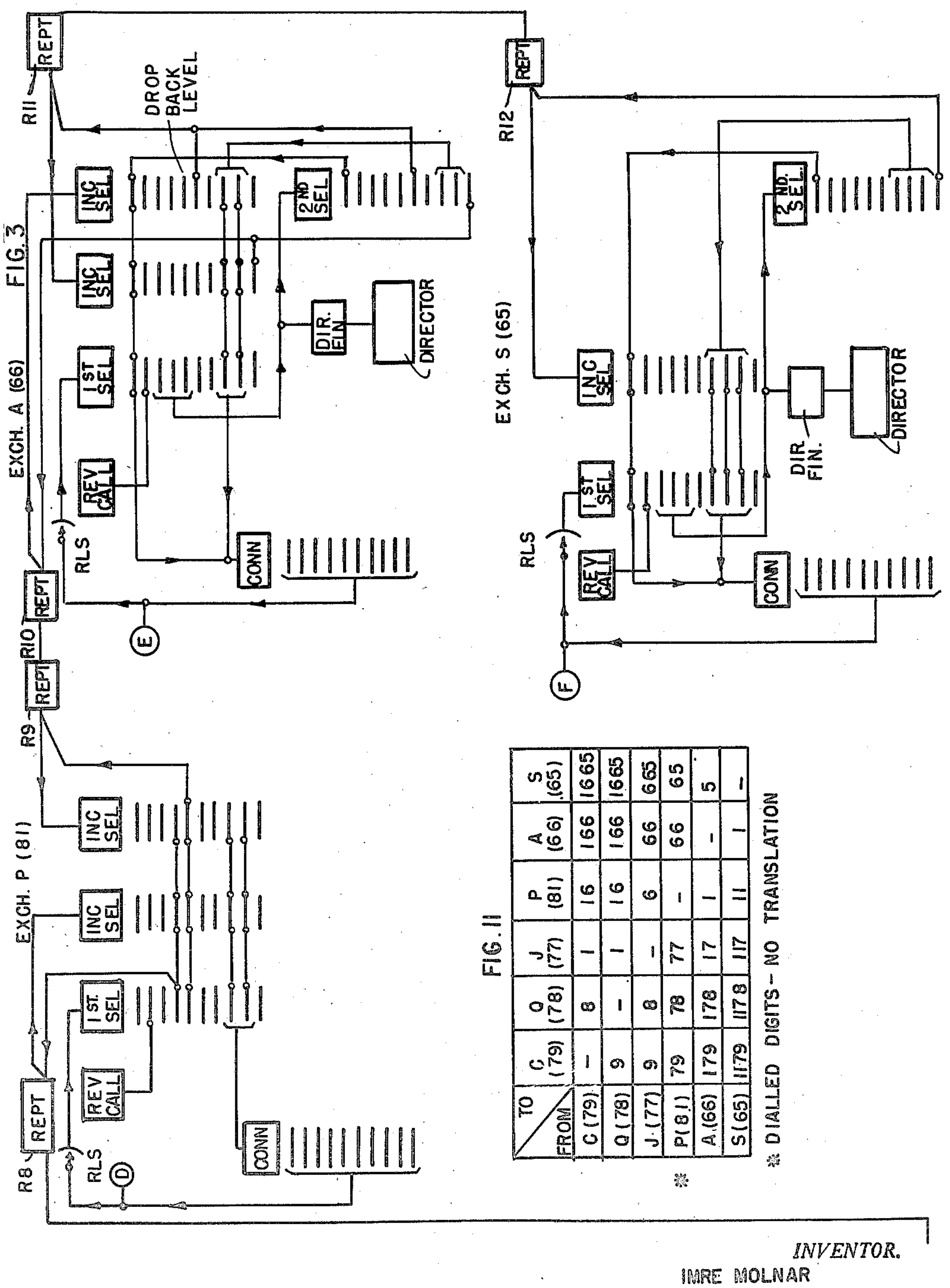
Figure 11 (included with Figure 3) shows the digits transmitted by the director in response to the second digit of the office code on interoffice calls. Since there is no director at exchange P there is no translation, and both office digits are shown as dialled.

Referring to Figures 1, 2 and 3, a general description of the trunking arrangement will now be given. Calls originating at exchange C extend through individual lines switches of the well-known rotary step-by-step type and automatically select idle first selectors of the well-known Strowger vertical and rotary type. Local calls within the exchange C can be made by directly dialling the local subscriber's number, or by dialling the office code "79" of exchange C and then the subscriber's number. Local subscriber numbers are in the two, three, four and five hundred groups and therefore when the first local subscriber's digit is dialled, said 3 for example, the first selector is operated to the third level and automatically selects a connector in the three-hundred group. No director is needed in this connection and then in response to the dialled tens and units digits, the seized connector, which is also of the well-known Strowger vertical and rotary type, is operated step-by-step to connect with the local called subscriber's line. In case the calling subscriber prefixes the office code "79" to the subscriber's number then the first selector is operated to the seventh level in response to the first digit "7" to seize an idle director and second selector. In response to the next digit "9" and the subscriber's digits, the director is operated to record these digits. In this case, since the call is a local call, the director skips the office code digits and transmits only the subscriber's number without translation to operate the second selector to the second, third, fourth or fifth level, dependent on the called subscriber's hundreds digit, to seize an idle connector in the corresponding hundreds group. The seized connector is operated by the tens and units digits transmitted from the director to connect with the called line.

In case a subscriber at exchange C desires to call a subscriber at exchange Q the calling subscriber dials the office code "78" of exchange Q and then the subscriber's number. The first selector at exchange C is operated to the seventh level to seize an idle director and second selector in response to the first digit "7." In response to the second digit "8" and the subscriber's digits the seized director records such digits and then retransmits the digit "8" to operate the second selector to the eighth level to seize an idle repeater R1 terminating one of the trunks extending to exchange Q. The director then transmits the subscriber's number causing operation of repeaters R1 and R2 and an incoming selector and a connector at exchange Q to complete the call to the called subscriber.

Calls from exchange C to exchange J are taken care of in a similar manner by dialling the office code "77" and the subscriber's digits, but in this case the second digit "77" dialled into the director is translated to transmit the digit "1" thereby operating the second selector to its first level to route the call over one of the trunks and the associated repeaters, such as repeaters R3 and R4, after which the incoming selector IS1 and connector CS are operated by the subscriber digits to complete the desired connection to a called line in exchange J.

Calls from exchange C to exchanges beyond J are extended through exchange J. In calls to exchange P the office code "81" is dialled and then the subscriber's digits. The director seized from the eighth level of the first selector in exchange C responds to the second digit "1" and translates this digit into the digits "1" and "6" to operate the second selector in exchange C to the first level to connect with a trunk to exchange J and to then operate the incoming selector IS1 in exchange J to the sixth level to seize a trunk, including repeaters such as R7 and R8, to exchange P where an incoming selector and a connector are operated by the subscriber digits to connect to the called line, such as line D.

In calls from exchange C to exchange A, the office code "66" and the subscriber's digits are dialled by the calling subscriber. The director seized from the sixth level of the first selector in exchange C receives the second digit "6" and the subscriber's digits and translates the second digit "6" into the digits "1," "6" and "6" to route the calls as previously described to exchange P where an incoming selector is operated to the sixth level to select a trunk including repeaters such as repeaters R9 and R10 extending to exchange A. In response to the subscriber digits retransmitted from the director at exchange C, an incoming selector and a connector at exchange A are operated to complete the call to the called line, such as line E.

In calls from exchange C to exchange S the office code "65" and the subscriber's digits are dialled by the calling subscriber. The director seized from the sixth level of the first selector in exchange C receives the second digit "5" and the subscriber's digits and translates the second digit "5" into digits "1," "6," "6" and "5" to route the call to exchange A, as previously described, where the incoming selector is operated to the fifth level to select a trunk, including repeaters such as R11 and R12, extending to exchange S. The retransmitted subscriber digits then operate an incoming selector and a connector at exchange S to complete the call to the called line such as line F.

Local calls in exchanges Q, J, A and S are made in the same manner as explained for exchange C, by either dialling only the subscriber's digits, or by dialling the local office code plus the subscriber's digits. In the first case the directors are by-passed, and in the second case they absorb the office code digits and retransmit only the subscriber's digits. Inter-exchange calls from exchanges Q, J, A and S are also made in the same manner as explained for exchange C, the first selectors thereat being operated in accordance with the first digit of the received office code, while the directors translate the second digit of the office code into the digit or digits required to route the call to the wanted exchange. The two-digit office codes for exchanges C, Q, J, P, A and S are respectively "79," "78," "77," "81," "66" and "65," the second digits of which are translated into one, two, three or four digits as necessary, as indicated in Figure 11.

In calls from exchange Q to exchange C, the office code "79" is dialled, and the director seized from the 7th level of the first selector at exchange Q, retransmits the second digit "9" to cause the second selector at exchange Q to select an idle trunk to exchange C over the 9th level. In calls from exchange Q to exchange J the director seized from the 7th level translates the second digit "7" to the digit "1." In calls from exchange Q to exchange P the director seized from the 8th level of the first selector translates the second digit "1" to the digits "1 6." In calls from exchange Q to exchange A the director seized from the 6th level of the first selector translates the second digit "6" of the office code to the digits "166," and in calls to exchange S this director translates the second office digit to digits "1665."

In calls from exchange J to exchanges Q and C the office selecting digits transmitted by the director at J are "8" and "9" respectively. In calls from exchange J to exchange P the office selecting digit is digit "6," to exchange A the digits are "6" and "6," and to exchange S the digits are "6," "6" and "5."

In calls from exchange A to exchange S the office selecting digit "5" is transmitted from the director to operate the second selector at exchange A to the fifth level to select a trunk to exchange S. In calls from exchange A to P, J, Q and C the office selecting digits transmitted from the director at exchange A are respectively "1," "17," "178," and "179."

In calls from exchange S to exchanges A, P, J, Q and C the respective office selecting digits transmitted from the director exchange S are "1," "11," "117," "1178" and "1179."

It will be noted that exchange P does not have a director, since any exchange in the network can be reached from exchange P by means of the regular two-digit office code, without translation. In a larger network this might not be possible, in which case directors would be provided at all exchanges. In the present instance in the case of a call from exchange P to exchange S the calling subscriber first dials the office code "65" of exchange S and then the subscriber's number, in the usual manner. In response to the first digit "6," the first selector at exchange P engages a trunk including repeaters such as R9 and R10 extending to exchange A. In response to the second digit "5" the right hand incoming selector in exchange A is operated to the fifth level to extend the call to the incoming selector in exchange S through repeaters such as R11 and R12. An incoming selector and a connector in exchange S are then operated by the subscriber digits to complete the connection to a called line in exchange S.

In a call from exchange P to exchange A the office code "66" is dialled. The first selector at exchange P is again operated to the sixth level to seize a trunk to exchange A and to seize the right-hand incoming selector thereat. In response to the second digit "6," this incoming selector is operated to the sixth level from which it automatically restores to normal. Drop back selectors of this type are well-known and are similar to that shown in Lomax Patent 1,747,478 issued February 18, 1930. In response to the remaining digits, this incoming selector and a connector are operated to complete the call in the usual way.

In calls from exchange P to exchange J, the office code "77" is dialled and the first selector at exchange P is operated to the seventh level to seize the incoming selector IS3 in exchange J over a trunk including repeaters such as R8 and R7. The incoming selector IS3 is also of the drop-back type and is arranged to release whenever the seventh level is dialled. Therefore, in response to the second dialled digit "7" the incoming selector IS3 drops back to normal and is then reoperated by the first dialled subscriber's digit to select an idle connector which is then operated to complete the call. Calls from exchange P to the other exchanges are made in the well-known manner and need not be described. The repeaters diagrammatically shown in Figures 2 and 3 are of the well-known two-way automatic-to-automatic telephone type for repeating pulses in either direction over the two conductor trunks interconnecting the exchanges.

Figure 4:
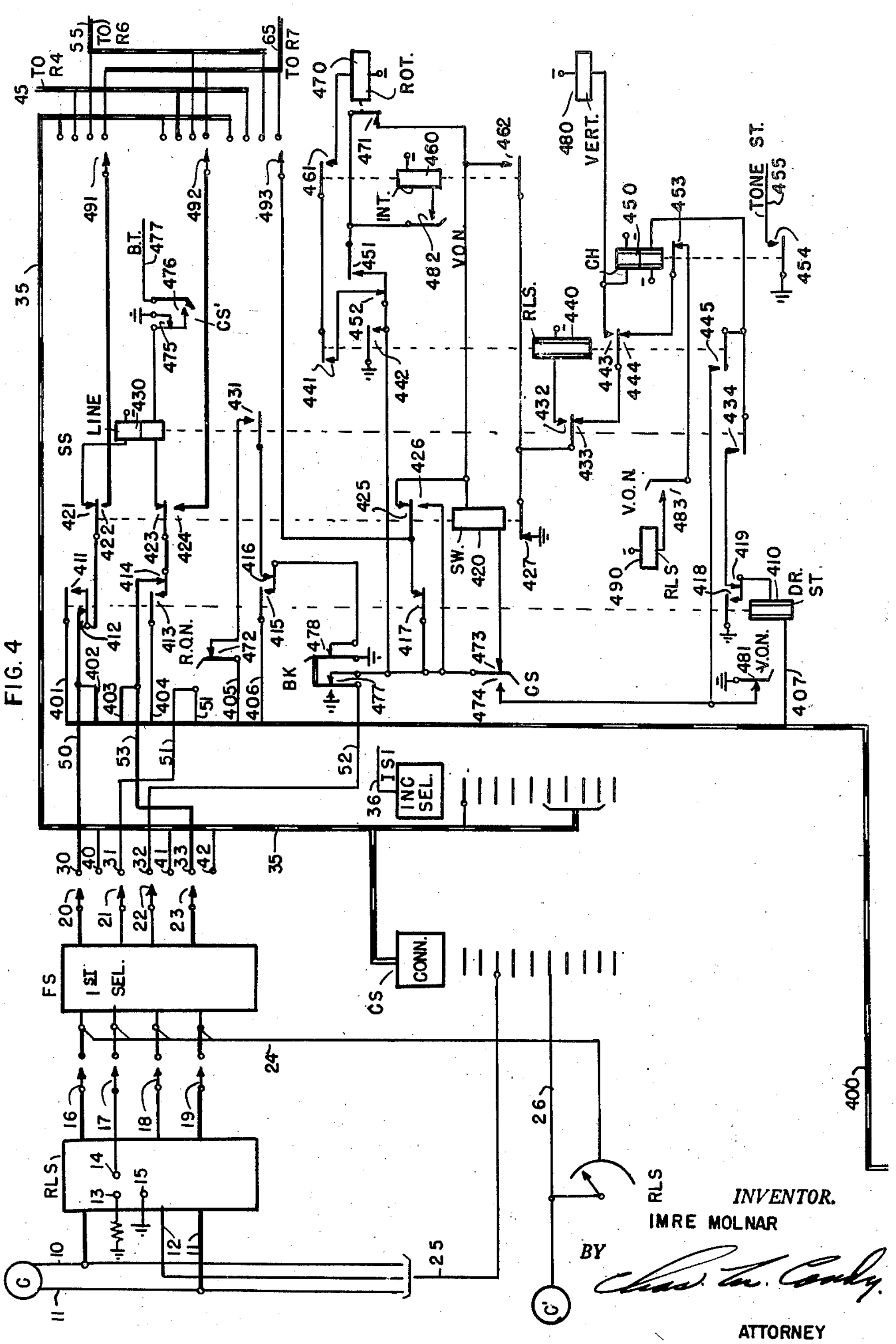

In Figure 4 two of the subscribers' lines terminating in exchange J are shown at C and C'. The subscribers' lines in the exchanges have individual rotary line switches, such as RLS, associated therewith. Rotary line switches of this type are well-known and are used to automatically select an idle one of the first selectors such as FS, in response to the initiation of a call at this exchange. The first selectors are of the well-known Strowger vertical and rotary type and as shown have access to second selectors, such as SS, on certain levels and to local connector switches, such as CS, on other levels. The local connector switches are also of the well-known Strowger vertical and rotary type and have access to the subscribers' lines, such as C and C', terminating in exchange J. The second selector SS is also a Strowger switch and has access through its bank contact levels to the local connectors, and to repeaters terminating trunks to adjacent exchanges C, Q, and P as illustrated in Figure 2.

Figure 5:
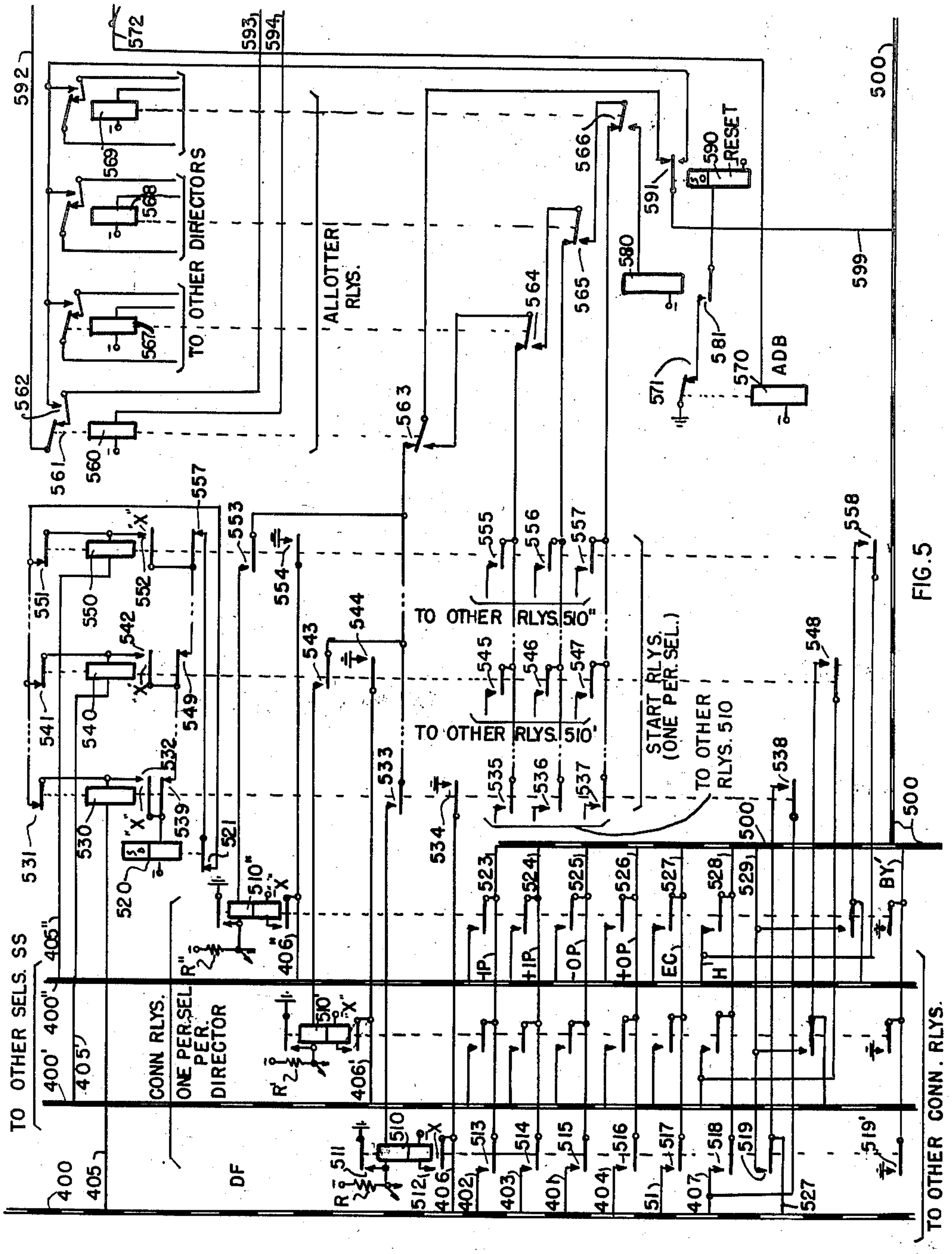

Figure 5 diagrammatically illustrates an all-relay director-finder DF for operatively connecting second selectors, such as SS, to an idle director, such as DR shown in Figures 6, 7, 8 and 9. A start relay 530 is individual to the selector SS and each other such selector has a corresponding individual start relay, such as relays 540 and 550. These individual selector start relays are arranged in a chain circuit with a common relay 520 so that only one of said start relays can be operated at a time. Connect relays, such as relay 510, 510' and 510'' and provided to interconnect the second selectors to idle directors. There is one connect relay, such as relay 510, per selector per director, i. e., the relay 510 is provided to connect the second selector SS to the director shown in Figures 6, 7, 8 and 9, another connect relay (not shown) is provided to connect selector SS to the second director and so on. The connect relays 510 for connecting the selector SS to the associated directors have their operating circuit connected in multiple as indicated through the common resistance R to negative battery. In a similar manner the connect relays 510', which are associated with the second of the second selectors are multipled through the common resistance R' to negative battery. Each selector, therefore has as many connect relays, such as relay 510, as there are directors for association with said selector.

In the upper right-hand corner is a chain of relays 560, 567, 568 and 569, one relay per director, for allotting idle directors for use in rotation. The circuit for relay 560 is shown in full while the remaining relay circuits are only diagrammatically illustrated, it being understood that each relay 567, 568 and 569 is connected to its corresponding director in the same manner as relay 560. Relays 580 and 590 are arranged to operate after the last idle director has been taken into use to reset and re-operate all allotter relays 560, 567, 568 and 569 corresponding to directors which are idle at that time. These relays are then held energized until the associated director is taken into use. The relay 570 is an all-director-busy relay which is normally energized as long as any one of the directors is idle.

Figure 6:
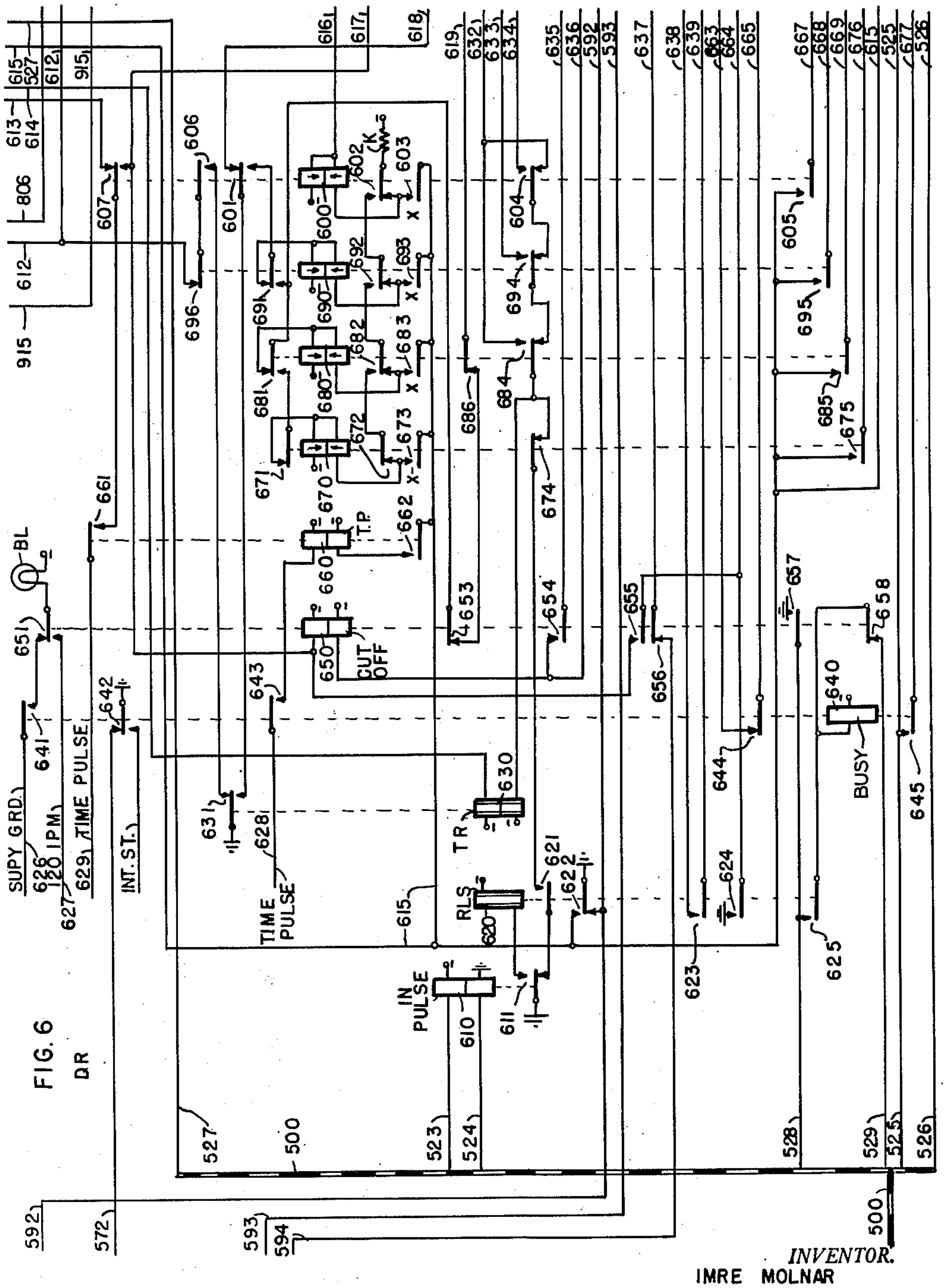
Figures 6, 7, 8 and 9 show the circuit details of one of the directors at exchange J.

A portion of the director DR is shown in Figure 6. The relays 670, 680, 690 and 600 in this figure are input control relays one of which is operated after each incoming dialled digit to transfer the impulses of the respective incoming digits to the proper minor switch registering devices in Figure 8. It should be noted however that these relays are differential relays of the type which operate their contacts in response to an inductive surge when their circuits are opened.

Figure 7:
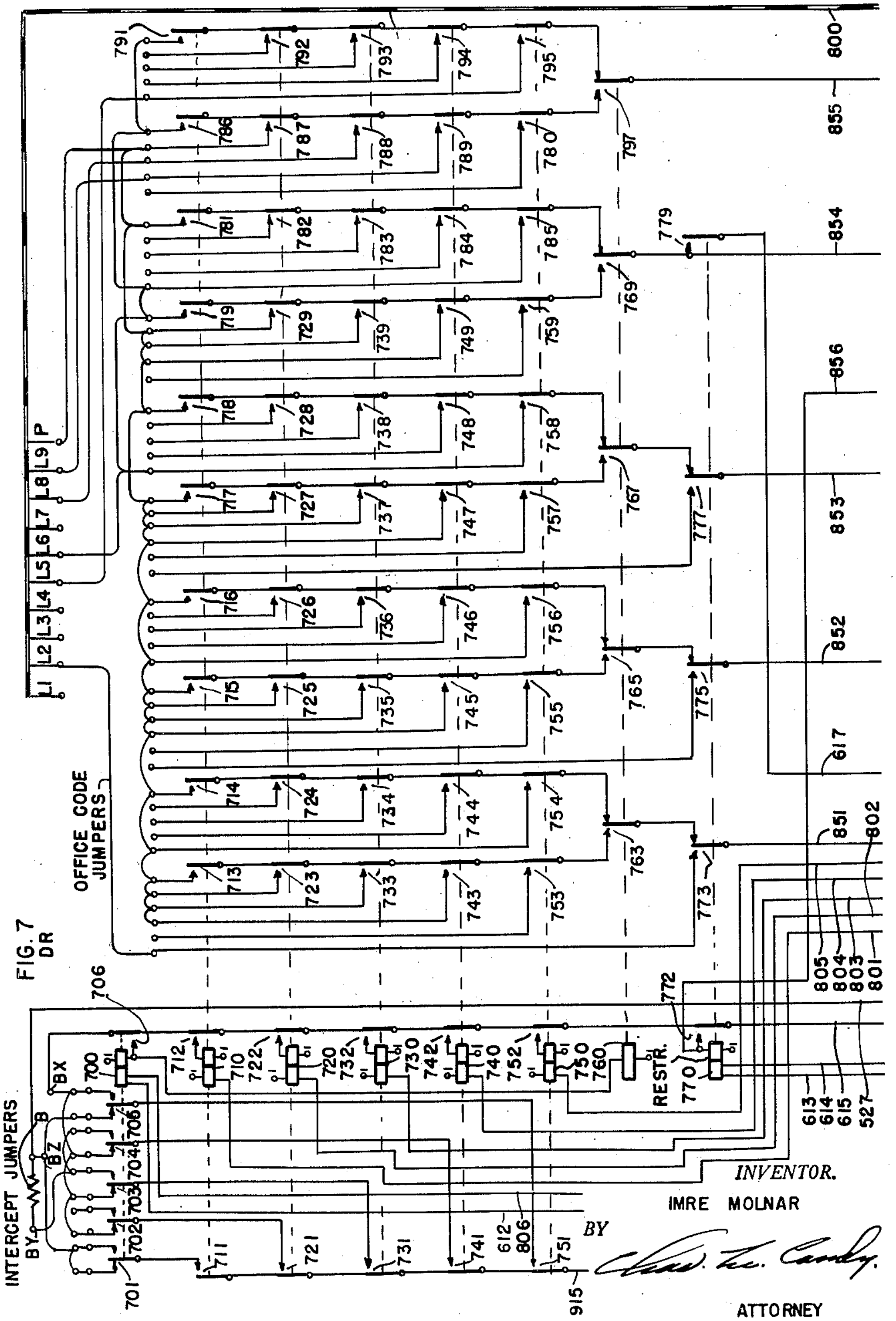

The relays 700 to 770 shown in Figure 7, are coding relays controlled by the second digit of the office or exchange code for controlling the circuits which route the call through to the proper exchange. In the upper left hand corner of Figure 7 is shown a cross-connecting arrangement for connecting up service restrictions in accordance with the class of the connected calling line, which may have unlimited service, partially restricted service, or fully restricted service, dependent upon the absence of potential, limited potential or full potential connected to the subscriber's extra control terminal 14 shown at the lineswitch RLS in Figure 4. Another cross connecting arrangement is shown in the upper portion of Figure 7 for cross connecting the contacts of the office code relays to the ten conductors of cable 800 which are multipled to the bank contacts of the minor switches in Figure 8 and to the contacts of the counting relays in Figure 9, for controlling the transmission of the proper impulse codes, to route the calls to their corresponding destination. In this arrangement the first digit dialled into the director causes the operation of an exchange, or office, code relay which closes a group of circuits which can be cross connected through the jumpering field for translating the single digit into any digit or digits up to five digits.

Figure 8:
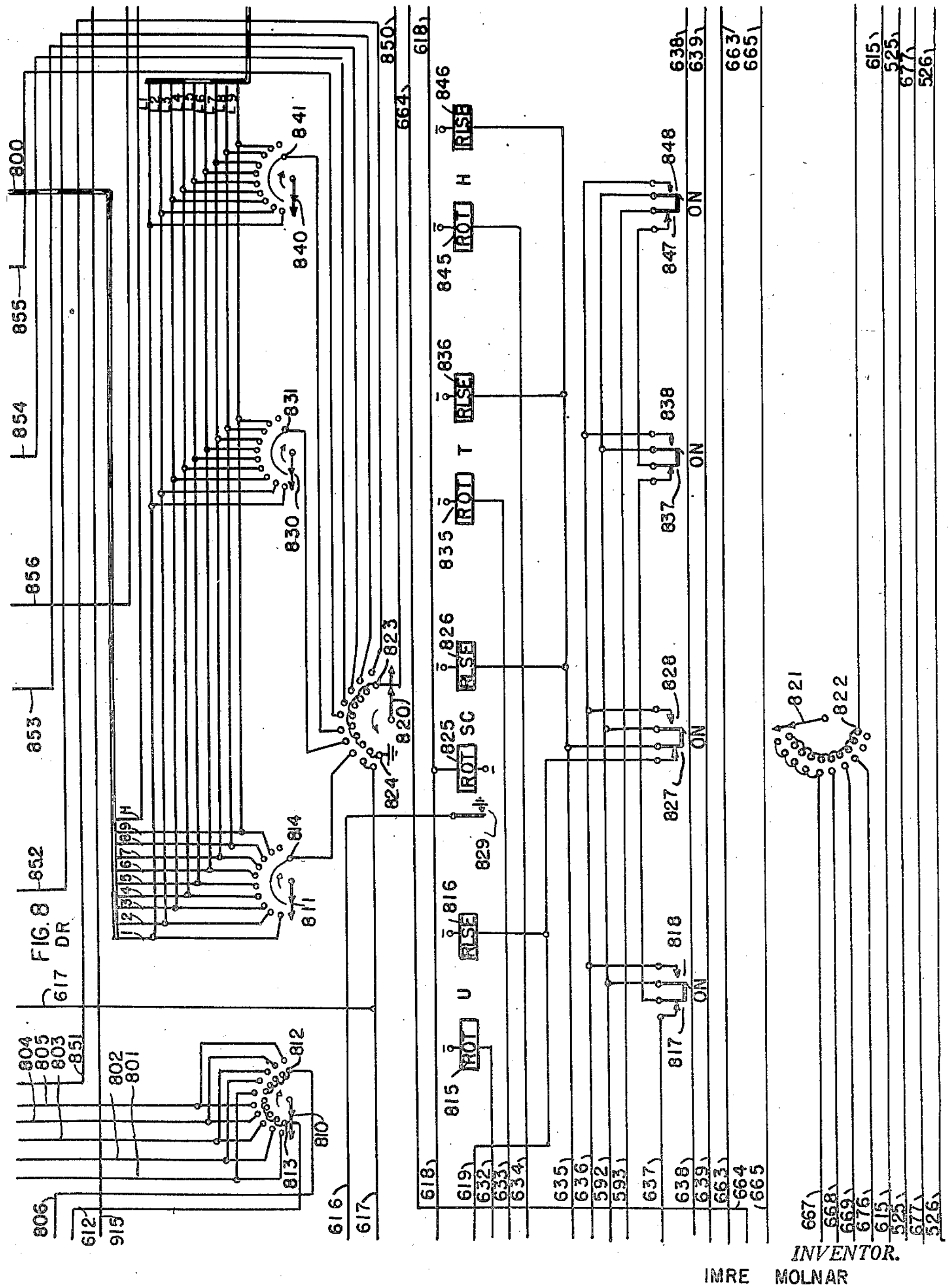

In Figure 8 are shown the director registering devices U, T and H which register the incoming dialled digits, and a sequence control switch SC for controlling the sequence of outgoing digits. The registering devices U, T and H and switch SC are commonly known as minor switches having a magnet for rotating the wipers one step for each impulse received and a release magnet for restoring such wipers to normal. The minor switch U is first operated in response to the receipt of the incoming second digit of the office code to control the operation of the office code relays in Figure 7 after which it is released and then later reoperated in accordance with the receipt of the units digit of the called line. The minor switches H and T are set in accordance with the hundreds and tens digits of the called line.

Figure 9:
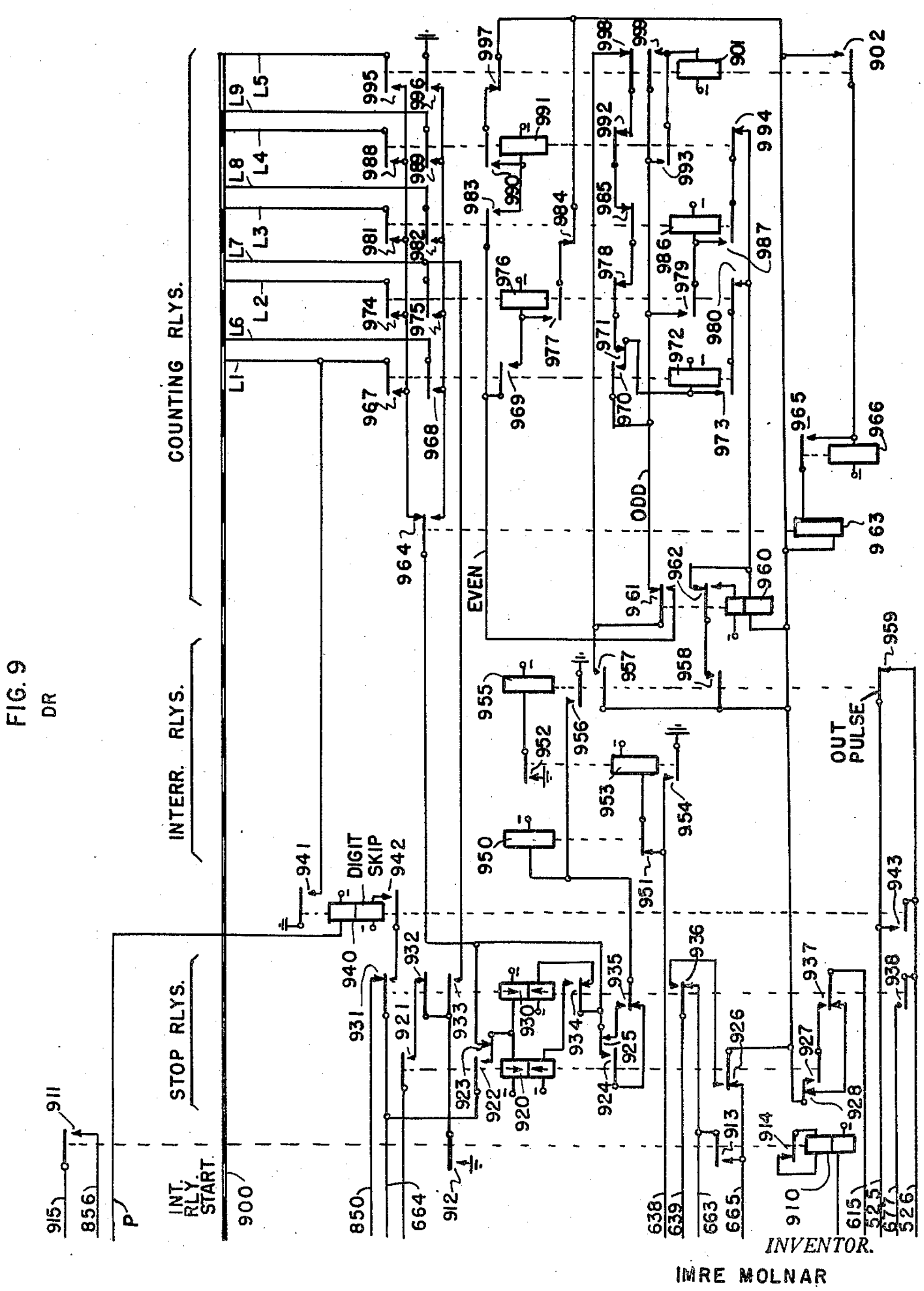

Relays 950, 953 and 955 in Figure 9 are interrupter relays for generating the director's outgoing impulses. Relays 960, 963, 966, 972, 976, 986, 991 and 901 are a group of counting relays which are operated to count the impulses in each outgoing digit. Relay 940 is a relay which is operated on certain calls for a purpose to be explained more fully hereafter. Relays 920 and 930 are differential stop relays which are controlled thru contacts of the counting relays to stop further transmission of outgoing pulses at the proper time.

Figure 10:
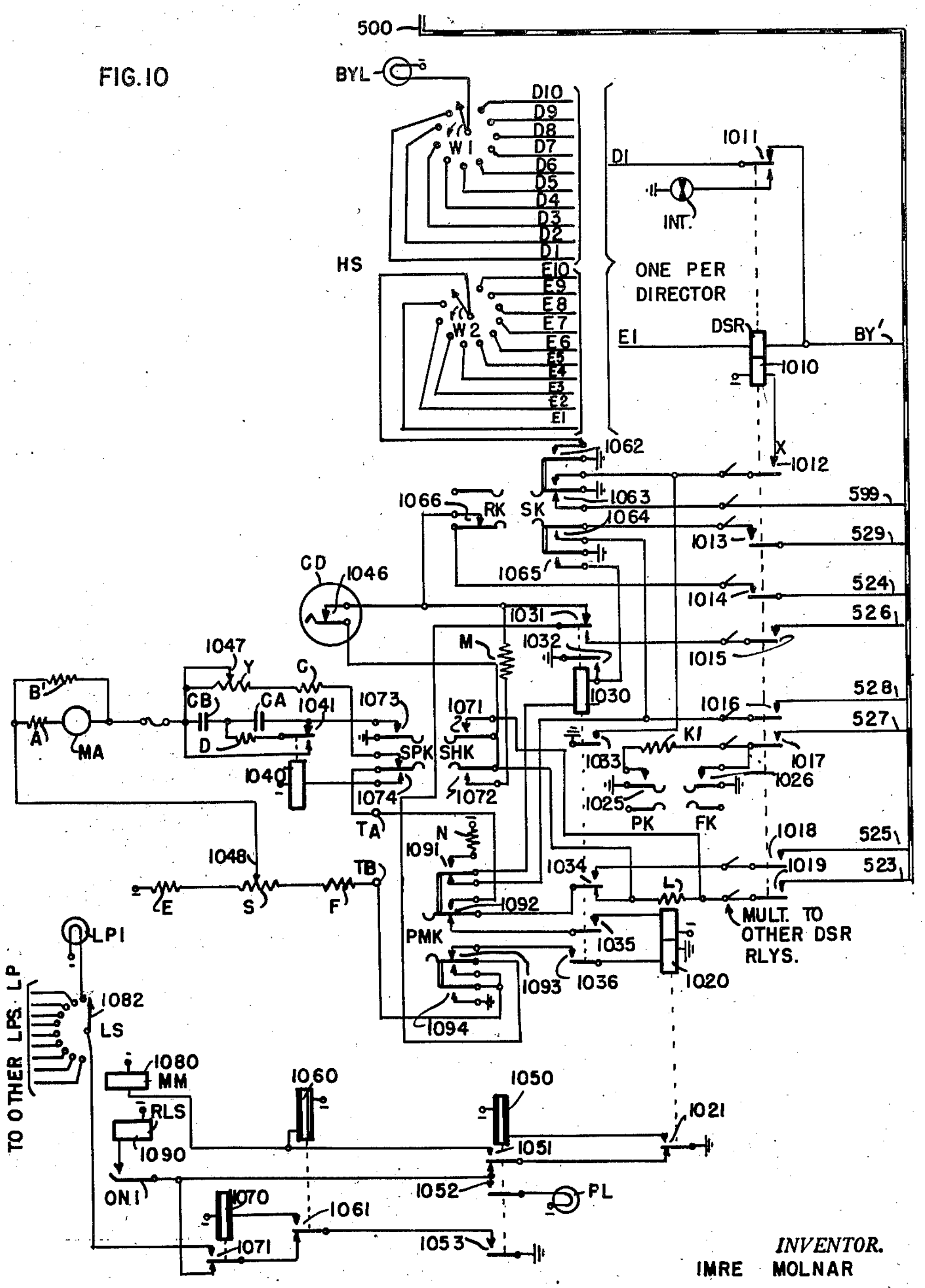
Figure 10 shows the circuit details of the director test set at exchange J.

The director routine test circuit in Figure 10 comprises a hand operated switch HS having 2 wipers W1 and W2 for selecting the director to be tested. A milliammeter MA, an impulse dial CD, a minor switch LS for lighting a lamp, such as lamp LP1, to indicate the digit dialled or transmitted by the director, and a number of keys and relays. There is one DSR relay 1010 for each director and the leads, such as conductors D1 and E1, terminate in the banks of the switch HS. The test circuits are multipled, as indicated, to contacts on all the director switching relays DSR so that each director can be tested.

Having given a general description of the invention, detail descriptions will now be given of the circuit operations of the apparatus in extending calls to local and distant subscriber lines. For example, since only part of the equipment in the exchange network is shown in detail in the exchange J, the detail descriptions will be given of calls originating from exchange J, it being understood that calls originating from other exchanges use similar apparatus which function in a similar manner.

*Local calls*

It will now be assumed that the subscriber C in exchange J desires to complete a local call to subscriber C' whose line also terminates in the same exchange. The trunking arrangement is such that in making a local call the calling subscriber may either dial the last three digits of the called local subscriber's number or may dial the office, or exchange, code digits before dialling the last three digits of the local called subscriber's number. Let it be assumed first that the calling subscriber omits dialling the office code digits and therefore dials only the last three digits of the called local number, which we will assume are the digits "4," "5" and "6."

In response to subscriber C removing his receiver, a circuit is completed over his line conductors 10 and 11 for operating the line relay (not shown) in his individual rotary line switch RLS. Rotary line switch RLS now operates in the well-known manner to select an idle first selector, such as selector FS in Figure 4. In response to dialling the first digit "4" selector FS operates its vertical magnet in the well-known manner to elevate its wipers opposite the fourth level of bank contacts and thereafter automatically rotates its wipers in search of an idle connector switch. Assuming that the connector switch CS in Figure 4 is the connector taken into use, selector wipers 20, 22 and 23 stop on bank contacts 40, 41 and 42 associated with this connector. Connector CS is operated first in a vertical direction in response to the second digit "5" and then in a rotary direction in response to the last digit "6" to engage the bank contacts terminating the called subscriber's line. If the called line is idle the connector switches through and rings the called subscriber C' in the well-known manner. When the called party answers, the desired local connection is completed and after conversation the switches are released in the usual way.

It will now be assumed that subscriber C in desiring to complete a local call to subscriber C' dials the exchange code "77" and then the digits "4," "5" and "6." The rotary line switch RLS and the first selector FS operate in the same manner as just described with the exception that the first selector is now elevated to the seventh level instead of the fourth, and is automatically rotated in search of an idle second selector. Assuming that the second selector SS, Figure 4, is the first idle second selector in the seventh level then the wipers 20, 21, 22 and 23 stop in engagement with the bank contacts 30, 31, 32 and 33 respectively associated with selector SS. A circuit is now completed over the calling line loop in operating line relay 430 as follows: from ground at cam springs 475 at the upper right, lower winding of relay 430, contacts 423 and 414, conductor 53 and contacts 33, wipers 23 and 19, through the calling loop, wipers 16 and 20, contact 30, conductor 50, contacts 412 and 421, and through the upper winding of line relay 430 to battery. At contacts 432 relay 430 completes a circuit for operating the slow-to-release release relay 440 from grounded contact 427, and at contacts 431 completes a circuit for operating the start relay 530 in director-finder DF, Figure 5, as follows: from grounded contacts 478 of the busy key BK, contacts 416, 431 and 472, start conductor 405 in cable 400, winding of relay 530, contacts 531 and 521, through the series of contacts 557, 549 and 539 on the respective start relays associated with the different second selectors, and through the winding of slow-to-operate guard relay 520 to battery. Release relay 440 at contacts 442 grounds conductor 52 by way of contacts 477 to maintain the first selector FS and rotary line switch RLS in operated position, and to maintain ground on incoming test conductor 12 to busy the calling line. At contacts 445 relay 440 completes an energizing circuit through the lower winding of slow-to-release change-over relay 450 from grounded vertical off-normal contacts 431.

Start relay 530 in the director finder energizes over the above traced circuit and closes contacts 532 first to lock itself through relay 520 before opening its original energizing circuit at contacts 531 and 539. At contacts 539 relay 530 opens the circuits to the other start relays, such as relays 540 and 550, to prevent their energization at this time, at contacts 533, 535, 536 and 537 completes a circuit for one of the connect relays, such as relay 510, dependent upon which idle director has been preselected for use. In this case, since the director in Figures 6, 7, 8 and 9 has been preselected for use by the energization of relay 560, connect relay 510 is operated over the following circuit: from ground at back contacts 1063 of seize key SK, Figure 10, conductor 599 included in cable 500, back contacts 591, make contacts 563, contacts 533, thru the upper winding of connect relay 510, and thru the common resistance R to battery.

It is believed advisable at this point to explain in detail how the directors are preselected for use in rotation. As shown in the detail circuits, relay 560 is energized over the following circuit: from ground at back contacts 622, conductor 592, contacts 561, conductor 593, off-normal contacts 847, 837 and 817, conductor 637, contacts 656, conductor 594 and thru the winding of relay 560 to battery. In case directors corresponding to relays 567, 568 and 569 were also idle then these relays would normally also be operated over similar circuits in their respective directors. Whenever a director is taken into use the release relay corresponding to relay 620 is energized in a manner described hereinafter to disconnect ground from the corresponding conductor 592 to release the allotter relay corresponding to relay 560. When all directors are busy all of the allotter relays 560, 567, 568 and 569 and the all-directors-busy relay 570 will be deenergized. However, as soon as any one of the directors become idle, conductor 572 will be grounded to re-operate relay 570. In addition, when all of the relays 560, 567, 568 and 569 are restored, relay 580 is operated from grounded conductor 599, back contacts 591, 563, 564, 565 and 566, and winding of relay 580 to battery. In case there are one or more directors idle, relay 570 will be operated and relay 580 at contacts 581 completes a circuit for operating the slow-to-operate reset relay 590. At make contacts 591 relay 590 connects grounded conductor 599 to the break contacts, such as contact 562, on all the allotter relays to energize the allotter relays corresponding to idle directors. For example, assuming that the director in Figures 6, 7, 8 and 9 is idle, then ground is extended thru contacts 562, conductor 593, thru off-normal contacts 847, 837, and 817, conductor 637, contacts 656, conductor 594 and thru the winding of relay 560 to battery. Allotter relays 567, 568, and 569 are also operated over similar circuits providing the corresponding directors are idle. At contacts 563 relay 560 prepares circuits to connect relays 510, 510′ and 510″ for connecting this director to the second selector originating the next call. Contacts 564, 565 and 566 are likewise operated, if the corresponding directors are idle, to prepare circuits for operating the connect relays for the second, third and fourth directors. The allotter relays, upon operation, lock thru contacts, such as contacts 561, until the associated director is taken into use. The operation of any one allotter relay opens the circuit of relay 580 which releases and at contacts 581 opens the circuit to the reset relay 590 which then deenergizes to prepare the circuit for operating the connect relays.

Returning now to the time when connect relay 510 was operated, said relay at contacts 512 completes a locking circuit from contact 534 thru its lower winding and at contacts 511 grounds the previously mentioned multiple to similar relays 510 to prevent their energization. At contacts 513 and 514 relay 510 operates the director line relay 610 over conductors 523 and 524 in the cable 500, conductors 402 and 403 in cable 400 and the calling loop; at contacts 519 completes a circuit for energizing relay 410 in selector SS and relay 640 in the director as follows: from ground at vertical off normal contacts 481, contacts 445, 434 and 419, winding of relay 410, conductor 407 in cable 400, contacts 538 and 519, conductor 529 in cable 500, contacts 658, and thru the winding of relay 640 to battery; and at contacts 519′ relay 510 grounds the BY′ conductor in cable 500 to mark this director as busy to the test circuit of Figure 10.

When relay 410 in selector SS operates, contacts 418 close a locking circuit independent of the vertical off-normal springs 481, contacts 417 open one of the shunt circuits around relay 420; contacts 415 ground conductor 406 to maintain the locking circuit of relay 510; contacts 416 open the circuit of start relay 530 and relay 520; contacts 411 and 413 connect the selector line relay 430 to a closed loop comprising conductors 401 and 404 in cable 400, contacts 515 and 516, conductors 525 and 526 in cable 500, and pulsing contacts 959 in Figure 9 for maintaining relay 430 energized; and contacts 412 and 414 disconnect line relay 430 from the calling loop.

In the director finder, relays 530 and 520 restore when their circuit is opened at contacts 416, and re-close the start relay chain circuit. It should be noted that this chain circuit is so arranged that in case of simultaneous calls wherein two start relays, such as relays 530 and 540, are simultaneously energized, only one of the relays, that nearest the battery supply thru relay 520, is permitted to fully operate and lock. This arrangement prevents two selectors seizing the same director. At contacts 533 and 534 the circuits to the upper and lower windings of relay 510 are interrupted, but this relay is now maintained operated over conductor 406 from ground at contacts 478. At contacts 538 the original energizing circuit for relays 410 and 640 is opened, but these relays are maintained operated over contacts 625, conductor 528, contacts 518, conductor 407 and contacts 418, due to the operation of release relay 620 in response to the operation of the director line relay 610 to close contacts 625.

It should be noted that relay 560 is deenergized, as soon as the director line relay 610 and release relay 620 are operated, to preselect the next idle director. Let us assume that the second director is idle and that relay 567 is in operated position when relay 560 restores and that start relay 530 has not as yet restored. Under these conditions a circuit is completed from grounded conductor 599, back contacts 591, back contacts 563, front contacts 564, closed contacts 535 on relay 530, thru the upper winding of a second relay, not shown, similar to relay 510 and associated with the second selector, thru the multiple connection previously referred to and the resistor R to battery. This circuit is ineffective however, due to being shunted by ground from contacts 511 of the first connect relay, which thus guards the held director. This momentary circuit to the second relay is opened at contacts 535, as soon as relay 530 restores.

In the director, line relay 610 energizes as previously described and at contacts 611 completes the circuit for energizing release relay 620. At back contacts 622 relay 620 disconnects ground from conductor 592 to restore allotter relay 560, and at front contacts 622 grounds hold conductor 615. At contacts 625 relay 620 maintains relay 640 in operated position over conductor 528 as previously described. Relay 640 upon first operating over conductor 529 at contacts 641 closes a circuit to the busy lamp BL, at back contacts 642 removes one of the grounds from the common all-director-busy lead 572, at contacts 643 prepares a circuit for time pulse relay 660 from time pulse lead 628, at contacts 644 opens a point in the circuit to interrupter relay 953, and at contacts 645 prepares a circuit for shunting the impulse contacts 959 of pulsing relay 955. The director is now ready to receive the second digit of the called number.

One of the features of the invention relates to the provision in the second selector SS for automatically rotating to an 11th position to operate the cam springs and give the calling subscriber a busy tone in case the calling subscriber dials the second digit before an idle director is connected up for use. Assume now that the calling subscriber dials the second digit before an idle director is seized and in this case relay 410 has not been operated. In response to the second digit line relay 430 is operated in accordance with the digit dialled to step the wipers opposite the level corresponding to the digit dialled. Each pulse of the digit drops relay 430, to close a circuit for the vertical magnet as follows: grounded contacts 427, back contacts 433 of line relay 430, contacts 443 and thru the winding of the vertical magnet 480 to battery. A multiple circuit extends thru the upper winding of relay 450 to maintain this changeover relay in operated position during dialling. Release relay 440 is also maintained in operated position during dialling due to its slow release characteristics. On the first vertical step of the wipers, vertical off-normal springs 481, 482 and 483 operate. Springs 481 open the original energizing circuit of relay 450 but this relay is now maintained operated over its upper winding. Springs 481 also open the operate circuit of relay 410 to prevent the operation of this relay after the selector shaft has taken one step, while springs 483 close to prepare a circuit for release magnet 490, and springs 482 complete a circuit for relay 460 from ground at contacts 442, by way of contacts 451. At contacts 462 relay 460 completes a locking circuit for itself including contacts 427, 462, 471 and 482. Shortly after the last pulse of the second digit, changeover relay 450 restores and at contacts 452 closes a circuit including contacts 442, 452, 441 and 461 for operating the rotary magnet 470. Near the end of the first rotary step of the wipers rotary magnet 470 operates interrupter contacts 471 to open the locking circuit of relay 460 which deenergizes and at contacts 461 opens the circuit to the magnet 470. Magnet 470 releases and closes contacts 471. A circuit may now be traced for re-energizing relay 460 as follows: from ground at contacts 442, contacts 417 of relay 410 which did not operate because there was no seizure of an idle director, contacts 425, 471 and 402 to relay 460 and battery. Relay 460 at contacts 461 again closes the circuit to the rotary magnet 470 which again steps the wipers and again interrupts the stepping relay 460. The rotary magnet 470 and relay 460 interact as described until the wipers take their eleventh rotary step at which time cam springs CS and CS′ are operated. On the first rotary step of the shaft and wipers also, rotary off-normal contacts 472 open the start circuit to the director finder start relay 530 which releases the director finder to further guard against the seizure of an idle director and the operation of relay 410 in the second selector. At the 11th step cam contacts 474 complete a circuit for again operating relay 450, from ground at contacts 442, by way of cam springs 474, contacts 445 and lower winding of relay 450 to battery. At contacts 452 relay 450 opens the circuit to the rotary magnet 470 to prevent its re-operation. The operation of cam springs 476 connects busy tone and ground from conductor 477 through the lower winding of line relay 430 in place of direct ground at contacts 475 to transmit a busy tone to the calling subscriber over the talking conductors.

When the calling subscriber hears the busy tone, such subscriber will replace his receiver to release line relay 430 which causes the release of the second selector, the first selector FS and rotary lineswitch RLS. At contacts 432 relay 430 opens the circuit of release relay 440 which deenergizes after an interval. At contacts 442 relay 440 removes ground from control conductor 52 to release the first selector FS and lineswitch in the well-known manner and also opens the circuit to relay 450 which deenergizes. At contacts 453 relay 450 completes the circuit for operating release magnet 490 as follows: from ground by way of contacts 427, 433, 444, 453 and 483 to release magnet 490 and battery. Release magnet 490 operates and releases the shaft and wipers in the well-known manner. When the shaft reaches normal position the vertical off-normal springs are restored and at contacts 483 open the circuit of release magnet 490. The second selector SS is now fully restored and may again be used in establishing a connection.

With normal operation however, an idle director will be seized before the calling subscriber has had time to dial the second digit, and will be waiting for this digit, which in the present case will be a 7, as previously stated. In response to the receipt of the second digit 7, via conductors 402 and 403 through cable 400 and conductors 523 and 524 thru cable 500, line relay 610 drops back seven times to step the wipers 810 and 811 of switch U into engagement with their seventh bank contacts by operating the stepping magnet 815 from ground at back contacts 611, through contacts 621, back contacts 674, 684, 694 and 604 and the winding of magnet 815 to battery. A branch of this circuit extends from back contacts 674 thru the lower winding of relay 630 to cause this relay to operate. Relay 630 remains operated during the succeeding pulses, due to its slow release characteristics. On the first rotary step of switch U, off-normal springs 817 open and 818 close. Springs 817 open another point in the circuit of allotter relay 560 to prevent its energization and springs 818 prepare a circuit for relay 650.

Relay 630, upon operating, at make contacts 631 completes a circuit for operating stepping magnet 825 of sequence control switch SC by way of back contacts 601 and conductor 618. Magnet 825 steps wipers 820 and 821 into engagement with their first set of bank contacts and at contacts 829 completes a circuit over conductor 616 for simultaneously energizing both the upper and lower windings of relay 600. Relay 600 is a differential relay which does not energize at this time due to its opposing windings and is operated in its initial step to close contacts 603 by an inductive kick only when ground is removed from conductor 616. Shortly after the termination of the second digit 7 relay 630 restores and at make contact 631 opens the circuit to magnet 825 which deenergizes and removes ground from conductor 616. When ground is removed from conductor 616 an inductive kick is generated in relay 600 sufficient to close contacts 603. The closure of contacts 603 now completes a circuit from grounded hold conductor 615 thru the lower and upper windings of relay 600 in series to battery. As will be noted, the current flow is now in such a direction that both windings are aiding instead of in opposition and relay 600 operates completely. At contacts 606 relay 600 completes a circuit for operating relays 700 and 720 in series, at front contacts 601 and 602 prepares the circuit for the second kick-up transfer relay 690, at contacts 604 transfer the pulsing circuit from conductor 632 to 634 to cause the operation of the hundreds storage switch H is response to the next digit, and at contacts 605 completes a circuit for operating relay 910 from grounded hold conductor 615 by way of conductor 667, the first bank contacts and wiper 821 of the sequence switch SC, and the lower winding of relay 910 to battery. At contacts 607 relay 600 transfers the time pulse conductor 629 from the restrict relay 770 and the transfer relay 630, to the upper winding of cut-off relay 650.

The circuit energizing relays 700 and 720 in series may be traced as follows: from ground at back contacts 631, contacts 606 and 696, conductor 612, left-hand winding of relay 700, conductor 806, multipled contacts 812, wiper 810 in engagement with the seventh bank contact, conductor 802 and thru the left hand winding of relay 720 to battery. At contacts 706 relay 700 locks to the grounded hold conductor 615 and also completes a circuit for operating relay 760. At make contacts 702 relay 700 connects make contact 721 to a dead terminal thereby preventing the operation of relay 770. Relays 720 and 760 at contacts 723 and 763 complete a circuit for operating the digit skip relay 940 as follows: from grounded conductor 664, back contacts 931, conductor 850, wiper 820 in engagement with its 1st set of bank contacts, conductor 851, back contacts 773, front contacts 763, contacts 723, the multiple connections cross-connected to conductor P included in cable 800 and thru the upper winding of relay 940 to battery.

Relay 910 operates, over its previously traced circuit, and at contacts 913 completes the circuit for energizing interrupter relay 953 as follows: from grounded conductor 615, back contact 937, contacts 928, back contacts 926, contacts 913, back contacts 936, conductor 639, contacts 623, conductor 638, contacts 951 and thru the winding of relay 953 to battery. Digit skip relay 940 upon operating over its previously traced circuit at contacts 942 prepares a locking circuit for itself, at contacts 943 closes a shunt around pulsing contacts 959 and at contacts 941 grounds stop conductor L1. Relay 953 at contacts 954 closes a locking circuit for itself thru contacts 951 and at contacts 952 completes the circuit for interrupter relay 955. Relay 955 opens pulsing contacts 959, but without effect at this time, since these contacts are now shorted at contacts 943. Relay 955 also, at contacts 956 complete the circuit for interrupter relay 950 and at contacts 957 closes a circuit for the first counting relay 972 as follows: from grounded conductor 615, back contacts 937, contacts 928, 957, 998, 992, 985, 978, and 971 and thru the winding of counting relay 972 to battery. Interrupter relay 950 at contacts 951 opens the circuit of interrupter relay 953 which releases and at contacts 952 opens the circuit to relay 955, which also deenergizes and at contacts 956 opens the circuit to interrupter relay 950. Relay 950 restores and recloses the circuit to relay 953 at contacts 951 to restart the interrupter relays 953, 955 and 950 in a new cycle as just described. The cycle of operation of the interrupter relays continues until ground is removed from conductor 638 by the operation of stop relay 920.

In order to describe the complete operation of the counting relays in transmitting the outgoing digit "0" for example, it will be assumed that the digit skip relay 940 is not operated and therefore stop conductor L1 is not grounded and outgoing pulsing contacts 959 are not short circuited by contacts 943 of relay 940.

Counting relay 972, upon energizing, at contacts 967 connects conductor L1 to relays 920 and 930, and assuming conductor L1 is not grounded at this time neither stop relay 920 or 930 operate. At contacts 969 relay 972 prepares a circuit for the second counting relay 976, and at contacts 970 completes a new circuit for relay 972, independent of the chain of back contacts on the other counting relays, by way of back contact 961 and contact 957. At contacts 973 relay 972 prepares a locking circuit for itself in series with relay 960 which at this time is shunted by ground on both sides of its lower winding. When interrupter relay 955 restores however the short circuit around relay 960 is opened and relay 960 energizes in series with relay 972 as follows: from grounded conductor 615, back contacts 937, contacts 928, lower winding of relay 960, contacts 980 and 973, and through relay 972 to battery. At back contacts 961 relay 960 opens the counting circuit to the "Odd" conductor and at make contacts 961 connects the counting circuit to the "Even" conductor to prepare a circuit to the second counting relay 976.

When interrupter relay 955 is operated on the second cycle operation, it extends ground over contacts 958 and front contacts 962 through the upper winding of relay 960 to hold relay 960 energized, and at contacts 957 causes the same ground to operate the second counting relay 976 over make contacts 961, the "Even" conductor and contacts 969. At contacts 974 relay 976 connects conductor L2 to the stop relays 920 and 930 but again without result, since conductor L2 is not marked with ground on this call. At contacts 977 relay 976 completes a locking circuit for itself by way of contacts 984, 928 and 937 to grounded conductor 615, at contacts 978 opens the chain circuit for the first counting relay 972, at contacts 979 prepares a circuit for the third counting relay 986, and at contacts 980 opens the locking circuit of the first counting relay 972 which deenergizes.

When interrupter relay 955 restores, said relay at contacts 958 opens the locking circuit of relay 960 which deenergizes to transfer the counting circuit back to the "Odd" conductor to further prepare the circuit to the third counting relay 986.

When interrupter relay 955 is operated in the third cycle of operation counting relay 986 is operated from grounded conductor 615, contacts 937, 928, and 957, back contacts 961 and contacts 979 thru the winding of relay 986 to battery. At contacts 958 relay 955 closes a short circuit around the lower winding of relay 960. Relay 986 at contacts 987 closes another short circuit around the winding of relay 960 as well as preparing a locking circuit for itself in series with relay 960. At contacts 981 relay 986 connects conductor L3 to stop relays 920 and 930 without effect, and at contacts 983 prepares the circuit for the fourth counting relay 991. At contacts 984 relay 986 opens the locking circuit of relay 976 which restores.

When interrupter relay 955 again deenergizes, the short circuits around the lower windings of relay 960 are opened, and this relay now energizes in series with relay 986 from grounded conductor 615 by way of contacts 937, 928, lower winding of relay 960, contacts 994 and 987 and winding of relay 986 to battery. Relay 960 again transfers the interrupter counting circuit from the "odd" to the "even" conductor.

When interrupter relay 955 operates in the fourth cycle, counting relay 991 is operated from grounded contacts 957, make contacts 961, contacts 983 and thru relay 991 to battery. At contacts 988 relay 991 connects conductor L4 to the stop relays 920 and 930, and at contacts 999 completes its own locking circuit by way of contacts 997, 928 and 937. At contacts 993 relay 991 prepares the circuit of the fifth counting relay 901, and at 994 opens the locking circuit of the third counting relay 986 which restores. Relay 960, however, is maintained operated over its upper winding and contacts 962 and 958 until relay 955 restores. When relay 955 restores relay 960 also restores and transfers the interrupter counting circuit to the "odd" conductor.

When interrupter relay 955 operates in the fifth cycle, counting relay 901 operates from grounded contacts 957, and back contacts 961 and contacts 993. At contacts 995 relay 901 connects conductor L5 to stop relays 920 and 930, and at contacts 997 opens the circuit of relay 991 which restores. At contacts 999 relay 901 locks independent of contacts 993, and at contacts 902 operates relay 966 over contacts 928 and 937 to grounded conductor 615. Relay 966 at contacts 965 prepares its own locking circuit in series with relay 963 but relay 963 does not operate at this time because of the short circuit by way of contacts 965 and 902. When interrupter relay 955 restores, the circuit to relay 901 is opened and relay 901 restores and at contacts 902 removes the short circuit from relay 963 to permit this relay to operate in series with relay 966 from grounded conductor 615, by way of contacts 937, 928 and 965. Relay 963 at contacts 964 disconnects the marking leads L1, L2, L3, L4 and L5 and switches over to prepare circuits to leads L6, L7, L8 and L9.

The interrupter relay 955 is operated for the sixth to tenth pulses and relays 972, 976, 986, 991 and 901 are operated in the order named for the sixth, seventh, eighth, ninth and tenth pulses in the same manner as described for the first to the fifth pulses. However in this case, since contacts 964 are operated, the stop relays 920 and 930 are sequentially connected to the marking, or stop, conductors L6, L7, L8 and L9 and to ground at contacts 996 for the tenth pulse. Whenever any one of the stop conductors is grounded thru wiper 820 and operated contacts of the relays in Figure 7 the stop relay 920 is operated to stop outgoing pulse transmission for that particular digit, or if no stop conductors are grounded the counting relay chain counts ten pulses and contacts 996 close to operate the stop relay. Outgoing impulses are generated at contacts 959 of interrupter relay 955 and transmitted over the outgoing conductors 525 and 526, contacts 515 and 516 in Figure 5, conductors 401 and 404 to second selector SS in Figure 4.

When counting relay 901 is operated by the tenth interrupter pulse, ground at contact 996 completes a circuit for operating stop relay 920 as follows: ground, contacts 996, 964 and 923 and thru the upper winding of stop relay 920 to battery. A branch of this circuit also extends thru both the upper and lower windings of stop relay 930 but since this relay is a differential relay, it does not operate at this time.

Stop relay 920 at contacts 921 completes a circuit for energizing stepping magnet 825 of the sequence control switch SC by way of contacts 912, 932 and 921 and the magnet steps wipers 820 and 821 into engagement with their second set of bank contacts. At contacts 922 relay 920 closes its own locking circuit from grounded conductor 664 as well as maintaining a circuit thru the upper winding of relay 930; at contacts 924 and 935 interrupter relay 950 is maintained energized from grounded contacts 996; at back contacts 926 the circuit to interrupter relay 953 is maintained open; and at contacts 928 the locking circuit to any operated counting relay is opened to cause such relay, or relays, to restore. Due to the fact that none of the stop conductors L1 to L9, inclusive, were grounded, the interrupter relay 955 at contacts 959 has sent out ten pulses over conductors 525 and 526 to the switch train.

Having described the circuit operations of the counting relays when an outgoing digit "0" is to be transmitted for the purpose of giving a full detail description of the counting relay circuits, we will now return to the local call and since digit skip relay 940 is operated in a local call, contacts 941 are closed to ground stop conductor L1, and therefore stop relay 920 is operated from said grounded contact 941 and contacts 967, 964 and 923, when the first counting relay 972 is first operated. In this case, since the digit skip relay 940 is operated, contacts 943 short circuit outgoing pulse contacts 959 so that the pulses generated by contacts 959 are ineffective. Stop relay 920 upon operating, operates magnet 825, locks itself, maintains relay 950 operated, maintains the circuit to relay 953 open, and opens the locking circuit for the operated counting relays, in this case relays 972 and 960, in the same manner as previously described.

When the counting relays restore, ground is removed from the lower winding of stop relay 930 by disconnecting the grounded stop conductor, such as L1, from such lower winding. When the circuit thru the lower winding of relay 930 is opened, relay 930 is operated over its upper winding from grounded conductor 664 and contacts 922. Relay 950 also restores when the release of the counting relays disconnects ground from the lower winding of relay 930, and at contacts 951 prepares a circuit for interrupter relay 953. Relay 930, upon operating, at make contacts 931 locks digit skip relay 940 from grounded conductor 664 and make contacts 931 and 942 thru its lower winding, and at back contacts 931 disconnects ground from conductor 850 and wiper 820. At contacts 932 relay 930 releases magnet 825; at contacts 933 grounds stop conductor L7, but without effect at this time; at make contacts 934 prepares a circuit for the lower winding of relay 920; at contacts 936 and 937 re-operates relay 953 from grounded conductor 615, by way of contacts 937, 927, 926 and 936, conductor 639, contacts 623, conductor 638, and contacts 951; and at contacts 938 closes another shunt around outward pulsing contacts 959. This latter shunt circuit may be traced from contacts 959, contacts 938, conductor 677, contacts 645, and conductor 525, back to contacts 959.

Interrupter relay 953 reoperates relay 955 and the latter relay reoperates relay 950 and the first counting relay 972 from grounded conductor 615, make contacts 937, 927 and 957, contacts 998, 992, 985, 978 and 971 and through the winding of relay 972 to battery. Relay 972 locks, as previously described and at contacts 967 connects grounded stop conductor L1, which is still grounded from contacts 941 of digit skip relay 940, to the lower winding of operated stop relay 920 by way of contacts 964 and 934. Relay 920 is a differential relay, and with both windings energized in opposition relay 920 restores.

At contacts 923 ground is maintained thru the upper winding of relay 930 to hold this relay operated, and at contacts 925 relay 950 is maintained operated from grounded stop conductor L1. At make contacts 926 and 927 relay 920 opens the circuit of relay 953, and at make contacts 927 opens the circuit of relays 972 and 960. Relay 972 at contacts 967 disconnects grounded stop conductor L1 from both windings of relay 920 and from the upper winding of relay 930 whereupon the latter relay restores. Relay 950 also restores and both stop relays 920 and 930 are again in their normal positions. At make contacts 931 the locking circuit to relay 940 is opened, but at back contacts 931 the circuit to the upper winding is closed from grounded conductor 664, conductor 850, wiper 820 in second position, conductor 852, back contacts 775, front contacts 765, contacts 725 and thence over the multipled conductor P to the upper winding of digit skip relay 940 to battery to re-energize this relay. At contacts 933 relay 930 removes ground from conductor L7; at contacts 934 opens a point in the circuit to the lower winding of relay 920 and prepares a circuit to the lower winding of relay 930, and at back contacts 936 and 937 completes the previously traced circuit through contacts 913 for re-operating interrupter relay 953.

In the same manner as just described interrupter relay 953 operates relays 955 and 950 and relay 955 reoperates the first counting relay 972 which at contacts 967 again connects grounded stop conductor L1 to stop relay 920 which operates and causes the sequence switch magnet 825 to step its wipers into engagement with their third set of bank contacts. Stop relay 920 also momentarily stops the interrupter relays and releases the operated counting relay. When the counting relay restores relay 930 is operated and relay 950 restores. Relay 953 reoperates relay 955 and the first counting relay 972 to connect grounded stop conductor L1 to both windings of relay 920 to cause its release which in turn again restores the counting relay 972 to disconnect stop conductor L1, to cause relay 930 to restore. Relay 950 restores and reoperates relay 953 to start another cycle of operations.

The interrupter relays 953, 955 and 950, the counting relay 972, the stop relays 920 and 930, the digit skip relay 940, and the stepping magnet 825 continue to operate in the manner just described until the wipers 820 and 821 of the sequence control switch SC are operated into engagement with their sixth set of bank contacts at which point the circuit to relay 910 is opened at wiper 821 provided the calling subscriber has not yet dialled the third, or the hundreds, digit of the called number. In this case relay 910 restores and at contacts 913 opens the circuit to the first interrupter relay 953 to prevent re-cycling of the interrupter relays. It will be noted that the digit skip relay 940 was operated over wiper 820 when in engagement with its first five sets of bank contacts over conductors 851, 852, 853, 854 and 855, operated contacts of relays 760 and 720 and over the multipled jumper conductor connected to conductor P. The operation of digit skip relay 940 at contacts 941 has grounded stop conductor L1 to speed up the operation of the stop relays and the operation of the sequence control switch SC from its first to its sixth set of bank contacts, and at contacts 943 has shunted the pulsing contacts 959 with the result that all outgoing office routing digits have been skipped with the result that the director is now ready to retransmit the last three digits of the called number, generally called the subscriber's number.

When the calling subscriber dials the third digit "4," which is the second digit dialled into the director and the hundreds digit of the called number, the line relay 610 is restored four times to transmit four pulses to stepping magnet 845 of the hundreds register switch and to step the wiper 840 thereof into engagement with its fourth bank contact to store the hundreds digit of the called number. The circuit for operating magnet 845 extends from ground at back contacts 611, contacts 621, 674, 684, 694 and 604, conductor 634 and thru the winding of magnet 845 to battery. A branch of this circuit extends from contacts 674 thru the lower winding of relay 630 which operates and is maintained operated during the pulsing period. At contacts 631 relay 630 closes a circuit for energizing both windings of kick-up transfer relay 690 as follows: ground at make contacts 631, make contacts 601, break contacts 691, thru the upper winding of relay 690 to battery, and thru the lower winding of relay 690, back contacts 692, front contacts 602, and thru the associated resistance K to battery. Relay 690 is a differential relay and since the currents flowing thru the two windings are now in opposition the relay will not operate. Relay 630 releases shortly after the pulsing period and at contacts 631 opens the above traced circuit whereupon an inductive kick is developed in relay 690 sufficient to close contacts 693. When contacts 693 connect grounded conductor 615 to the lower winding of relay 690, the original circuit being open, both windings are energized in series, and the relay then operates fully. At contacts 696 relay 690 opens the original energizing circuit of relays 700 and 720 but these relays are maintained operated over their locking circuit. At contacts 691 relay 690 prepares a circuit for the next transfer kick-up relay 680 as well as preparing a circuit for release magnet 816 of switch U. At make contacts 694 relay 690 prepares a circuit to stepping magnet 835 of the tens register switch T, and at contacts 695 completes a circuit for re-energizing relay 910 as follows: grounded conductor 615, contacts 695, conductor 668, sixth bank contact and wiper 821 and multipled contacts, and thru the lower winding of relay 910 to battery. At contacts 913 relay 910 completes the previously traced circuit for energizing the first interrupter relay 953 to operate the interrupter relays, counting relays and stop relays, to transmit an outgoing digit corresponding to the digit just registered in the switch H.

In response to dialling the fourth, or tens digit "5", line relay 610 deenergizes five times and operates stepping magnet 835 to step wiper 830 of the tens switch T into engagement with its fifth bank contact over the following circuit: ground at back contacts 611, contacts 621, 674, 684 and 694, conductor 633 and thru the winding of stepping magnet 835 to battery. Relay 630 is again operated over a branch of this circuit and at make contacts 631 completes a circuit for operating the release magnet 816 of the units register switch U as well as energizing both windings of differential transfer kick up relay 680. The circuit for energizing release magnet 816 extends from ground, make contacts 631, 601 and 691, contacts 653 and 686, conductor 619 to release magnet 816 and battery. A branch of this circuit extends from make contacts 691 and back contacts 681 through the upper winding of relay 680 to battery and thru the lower winding of relay 680, back contacts 682, make contacts 692 and 602 and thru the associated resistance K to battery. Release magnet 816 operates to restore the wipers 810 and 811 of the units register to normal to prepare it to receive the incoming units digit. Shortly after the dialling of the tens digit, relay 630 restores to open the circuit to release magnet 816 and to open the circuit thru the two windings of differential transfer relay 680. When the circuit thru the two windings of relay 680 is opened, an inductive kick is generated to cause relay 680 to close contacts 683 whereupon ground from conductor 615 extends thru the lower and upper windings to cause the relay to fully operate. Relay 680, at make contacts 681 and 682 prepares the circuit to the next transfer relay, at contacts 686 opens the circuit to release magnet 816, at make contacts 684 prepares the pulsing circuit to the stepping magnet 815 of switch U, and at contacts 685 connects grounded conductor 615 over conductor 669 to the seventh bank contact of switch SC.

In response to dialling the fifth, or units digit "6", line relay 610 deenergizes six times and operates stepping magnet 815 six times to step wipers 810 and 811 into engagement with their sixth bank contacts to register the units digit 6. The circuit for operating magnet 815 extends from ground over contacts 611, 621, 674 and 684 and conductor 632. Relay 630 is operated as before and completes a circuit from contacts 631, 601, 691, 681, and 671 thru both windings of relay 670, contacts 672, 682, 692, and 602, and the associated resistance to battery. Differential transfer kick-up relay 670, in a manner similar to the other transfer relays, operates to close its contacts 673 when relay 630 restores, at which time both windings aid each other and the transfer relay fully operates. At contacts 674 relay 670 opens the pulsing circuit and at contacts 675 connects grounded conductor 615 to the eighth bank contact of switch SC to mark the receipt of the units digit.

It will be remembered that following the registration of the hundreds digit "4" in switch H, the wiper 821 of the sequence control switch SC is stepped into engagement with its sixth bank contact to complete the circuit for operating relay 910, and at contacts 913 this relay initiates the operation of interrupter relays 953, 955 and 950 as previously described. With switch wiper 820 in the sixth position, a circuit is no longer completed for digit skip relay 940, with the result that the outgoing pulsing contacts 959 are no longer shorted by contacts 943, and the director is ready to transmit the outgoing digit corresponding to the registered digit in the hundreds register H. Since the digit "4" is registered in the register H, the first four counting relays 972, 976, 986 and 991 are operated by interrupter relay 955 as previously described, and the pulsing contacts 959 have opened four times to transmit four outgoing pulses over conductors 525 and 526, contacts 515 and 516, conductors 401 and 404 in cable 400, contacts 411 and 413, contacts 421 and 423, both windings of line relay 430 to battery, and to ground thru contacts 475.

In response to the operation of the fourth counting relay 991, stop relay 920 is operated from the hundreds register switch H as follows: from grounded conductor 664, back contacts 931, conductor 850, wiper 820 in engagement with its sixth bank contact, wiper 840 of the hundreds register switch H in engagement with its fourth bank contact, conductor L4 in cable 900, contacts 988 of the fourth counting relay 991, back contacts 964, contacts 923, thru the upper winding of stop relay 920 and thru both windings of relay 930 to battery. Relay 920 operates over this circuit and at contacts 924 holds relay 950 operated to stop the interrupter relays momentarily, and thus stop the outgoing pulse transmission. Relay 920 also at contacts 921 completes the circuit for operating stepping magnet 825 to step wipers 820 and 821 into engagement with their seventh bank contacts in readiness to transmit the tens digit "5" stored on the tens register switch T. At wiper 821 sequence control switch SC completes a new circuit for relay 910 over conductor 669 and contacts 685. Relay 920 further, at contacts 928 opens the locking circuit to the operated counting relays, in this case relay 991, to cause its release. At contacts 988 relay 991 disconnects grounded conductor L4 from the lower winding of relay 930 whereupon said relay is operated thru its upper winding alone. Relay 950 now releases and at contacts 951 re-establishes the circuit for operating interrupter relay 953 over contacts 937, 927, 926, 936, 623 and 951. Relay 930 also opens the circuit to magnet 825 at contacts 932, and at contacts 933 grounds conductor L7 to cause the counting relays to count seven pulses for the inter-digital interval between outgoing digits. At contacts 938 relay 930 also closes a shunt around the pulsing contacts 959 by way of contacts 645, to prevent transmission of outgoing pulses during the inter-digital interval.

The interrupter relays 953, 955 and 950 now start operating again as previously described, to cause the counting relays to count up to seven, at which time relay 976 will be operated for the second time and relays 963 and 966 will be operated. At contacts 975 relay 976 completes a circuit from ground, contacts 912, 933, 975, 964 and 934 thru the lower winding of relay 920 to battery. Since stop relay 920 now has its upper winding energized over contacts 922 and is differential, the circuit thru the lower winding causes deenergization of relay 920. At contacts 923 and 934 the circuit thru both windings of relay 920 is maintained until the counting relay deenergizes. At contacts 925 interrupter relay 950 also is maintained operated until the counting relay restores, while contacts 923 maintain relay 930 operated. At contacts 927 the locking circuit to the operated counting relays is opened and such relays release. Counting relay 976 at contacts 975 disconnects ground from relays 930 and 950 which restore preparatory to transmitting the outgoing tens digit. Relays 950 and 930 again complete the circuit for reoperating interrupter relay 953, and relay 930 at contacts 938 removes the shunt from around the pulsing contacts 959.

The interrupter relays 953, 955 and 950 and the counting relays operate in the same manner as previously described to transmit the stored tens digit. Since the digit "5" is stored on the tens register switch T then conductor L5 is grounded as follows: from grounded conductor 664, contacts 931, conductor 850, wiper 820 in engagement with its seventh bank contact, wiper 830 in engagement with its fifth bank contact to conductor L5. When the fifth counting relay 901 operates a circuit is completed for stop relay 920 from grounded conductor L5, contacts 995, 964 and 923 and thru the upper winding of stop relay 920 to battery. The interrupter relay 955 has operated five times and at contacts 959 has transmitted five outgoing pulses over conductors 525 and 526. At contacts 921 relay 920 operates magnet 825 to step the wipers 820 and 821 of the sequence control switch SC into engagement with their eighth bank contacts for transmitting the units registration. At contacts 922 relay 920 locks and maintains the circuit closed thru both windings of relay 930, at contacts 924 maintains relay 950 energized for an interval, at contacts 926 opens the circuit to relay 953, and at contacts 928 opens the locking circuit of the operated counting relay 901 which restores. When relay 901 restores, this relay at contacts 995 removes ground from relay 950 and from the lower winding of relay 930 whereupon the latter relay operates over its upper winding, while relay 950 restores. At contacts 938 relay 930 again shunts pulsing contacts 959 for the inter-digital interval, at contacts 931 removes marking ground from wiper 820, at contacts 932 opens the circuit to magnet 825, at contacts 933 again grounds conductor L7, at contacts 936 and 937 completes the circuit for re-operating interrupter relay 953. Relay 910 is now held operated from wiper 821 and its eighth bank contacts from ground on conductor 615 passing through contacts 675 and conductor 676.

The interrupter relays 953, 955 and 950 now resume their pulsing cycle as previously described. Pulsing contacts 959 are now again without effect due to being shunted at contacts 938, but the counting relays count up to seven as before, at which time relays 976, 963, and 966 will again be operated. Upon the operation of relay 976, contacts 975 again complete a circuit from ground at contacts 912 through contacts 933, 975, 964, and 934 and the lower winding of stop relay 920 to battery. Both windings of relay 920 are now energized in opposition and this relay restores. At contacts 927 relay 920 opens the circuit to the counting relays and relay 976 restores and releases relays 930 and 950 preparatory to transmitting the outgoing units digit. Relays 930 and 950 again complete the circuit of interrupter relay 953, and relay 930 at contacts 938 removes the shunt from pulsing contacts 959.

The interrupter relays 953, 955, and 950 and the counting relays operate in the manner previously described to transmit the units digit "6" stored in the units register switch U. When the counting relay 972 is operated for the second time stop relay 920 is operated over the following circuit: from grounded conductor 664, contacts 931, conductor 850, wiper 820 in engagement with its eighth bank contact, wiper 811 in engagement with its sixth bank contact, conductor L6 in cable 900, contacts 968, 964 and 923 thru the upper winding of relay 920 to battery. In the same manner as previously described relay 920 at contacts 921 operates stepping magnet 825 of the sequence control switch SC, at contacts 924 holds relay 950 operated, at contacts 926 opens the circuit to relay 953, and at contacts 928 opens the locking circuit to the counting relays to cause such relays to restore. Relay 972 at contacts 968 opens the circuit to relay 950 and to the lower winding of relay 930 whereupon relay 930 operates over its upper winding. Relay 930 at contacts 932 opens the circuit to magnet 825, at contacts 935 opens the circuit to relay 950, at contacts 936 and 937 reoperates relay 953, and at contacts 938 shunts the pulsing contacts 959. The interrupter relays are started in a recycling operation for the inter-digital interval as previously described. Meanwhile, interrupter relay 955 at contacts 959 has transmitted the outgoing units digit "6" over the conductors 525 and 526 to the switch train.

Returning now to the transmission of the outgoing hundreds digit "4" from the director, line relay 430 is deenergized four times to operate the vertical magnet 480 of selector SS from ground by way of contacts 427, 433 and 443 to the vertical magnet 480 and to the upper winding of relay 450 in multiple. The vertical magnet 480 operates the shaft and wipers opposite the fourth level and relay 450 at contacts 451 closes a shunt around relay 420 as follows: from contacts 451, 471, winding of relay 420, cam contacts 473 and back to contacts 451. Relay 450 also at contacts 451 connects ground from contacts 442 thru vertical off-normal contacts 482 as soon as the wipers take their first vertical step, to relay 460 which operates. At contacts 462 relay 460 closes a locking circuit for itself thru contacts 471 and 427, and at contacts 461 prepares the circuit for rotary magnet 470. Shortly after the receipt of the hundreds digit, slow to release relay 450 restores, and at contacts 452 completes the circuit for operating rotary magnet 470 as follows: ground, contacts 442, 452, 461 and 461 to rotary magnet 470 and battery. Magnet 470 rotates the wipers 491, 492 and 493 into engagement with the first bank contact in the fourth level and at rotary off-normal contacts 472 opens another point in the start circuit to the director. At contacts 471 rotary magnet 470 opens the circuit of stepping relay 460 which restores. At contacts 461 relay 460 opens the circuit to the rotary magnet 470 which likewise restores. The operation of the second selector SS is now dependent upon the idle or busy condition of the first trunk in the fourth level. Assuming now that this trunk is busy then wiper 493 will engage a grounded bank contact to short circuit switching relay 420 and to reoperate stepping relay 460. The short circuit for switching relay 420 extends from grounded wiper 493, contacts 425, winding of relay 420, contacts 473 and 442 to ground. This same ground on wiper 493 extends from contacts 425 by way of contacts 471 and 482 to re-operate stepping relay 460. Relay 460 at contacts 461 again completes the circuit for re-operating the rotary magnet 470 which steps the wipers another rotary step and opens the circuit at 471 to stepping relay 460. This interaction between rotary magnet 470 and relay 460 continues until an idle trunk is reached or, if no idle trunks are available, until the wipers step off the bank contacts and operate cam springs 476 and 474 which stops the interaction between magnet 470 and relay 460 as previously described, and connects the busy tone at contacts 476 thru the lower winding of line relay 430 to advise the calling subscriber of the busy condition. When an idle trunk is reached, wiper 493 no longer engages a grounded bank contact, with the result that relay 460 is not operated and switching relay 420 is not short circuited. Relay 420 is now energized over the following circuit; from ground, contacts 442 and 473, winding of relay 420, contacts 471 and 482 and thru the winding of relay 460 to battery. Due to the high resistance of relay 420 stepping relay 460 is not operated in this circuit. At contacts 421 and 423 switching relay 420 disconnects and releases line relay 420, and at contacts 422 and 424 extends the incoming conductors 401 and 404 to wipers 491 and 492 and thence over the trunk line conductors included in cable 35 to the line relay in the seized connector, such as connector CS. At contacts 427 relay 420 opens the circuit to slow to release relay 440 which restores after an interval but not before ground is returned from the seized connector CS for maintaining relay 420 energized from grounded wiper 493, contacts 426 and 473, winding of relay 420, contacts 471 and 482 to relay 460 and battery. Shortly thereafter, relay 440 restores and at contacts 444 prepares a circuit for release magnet 490 which circuit is now open at contacts 427 of switching relay 420. The selector has switched through to the connector CS and the tens and units digits transmitted from the director now operate connector CS in the well-known manner to complete the connection to the called local subscriber C'.

Returning now to the director, following the transmission of the outgoing units digit, when the sequence switch SC stepped its wiper 820 into engagement with its ninth set of bank contacts it operated cut-off relay 650 from ground on multipled bank contacts 824, wiper 820, conductor 617 and through the upper winding of cut-off relay 650 to battery. At front contacts 651 relay 650 connects the busy lamp BL to interrupted ground on conductor 627 to flash the lamp, at contacts 654 prepares a circuit for the release of the magnets of the register switches and the sequence control switch, at contacts 655 locks itself to grounded conductor 664, at contacts 657 grounds conductor 528 to shunt down relay 410 in the second selector SS, and at contacts 658 disconnects relay 640 from conductor 529. Relay 640 remains operated however, from contacts 657 and 625.

The circuit for shunting down relay 410 in the second selector SS may be traced from ground, contacts 418, winding of relay 410, conductor 407 in cable 400, contacts 518, conductor 528 through cable 500 to ground at contacts 657. At contacts 411 and 413 relay 410 disconnects the director outward pulsing leads from the connector CS, at contacts 415 opens the locking circuit of connect relay 510 in the director finder to cause its release, and at contacts 412 and 414 switches over the talking conductors 50 and 53 of the calling line to wipers 491 and 492 to complete the talking connection to the called local line through the talking conductors of connector CS. Connect relay 510, upon restoring, disconnects the director from the second selector SS, and releases line relay 610.

In the director, the restoration of line relay 610 at contacts 611 opens the circuit of release relay 620 which restores. At make contacts 622 relay 620 disconnects ground from conductor 615 to release the operated relays 700, 720 and 760 in Figure 7, the operated kick-up transfer relays 670, 680, 690 and 600, and any operated counting relays in Figure 9, at contacts 623 opens the circuit to interrupter relay 953, at contacts 624 disconnects ground from conductor 664, at contacts 625 opens the circuit of relay 640 which restores, and at back contacts 622 grounds conductor 592. Ground on conductor 592 extends thru the off-normal contacts 818, 828, 838 and 848 of the register and sequence control switches and conductor 636 to the lower winding of cut-off relay 650 until all of these switches have fully restored and opened their respective off-normal contacts. Ground on conductor 592 from contacts 622 also extends by way of off-normal contacts 818 over conductor 636, contacts 654, conductor 635, and thru release magnets 826, 836 and 846 in multiple to battery, thereby releasing the sequence control switch SC, the tens register switch T and the hundreds register switch H. When these latter switches release, they open multiple circuits to the release magnets at off-normal contacts 828, 838 and 848, but the circuits to the release magnets are maintained at off-normal contacts 818 until the units register switch U is released. At off-normal contacts 837 and 847 a circuit is partially prepared for controlling the allotter relay 560 for this director. When sequence switch SC is fully restored, off-normal contacts 827 close a circuit for release magnet 816 from conductor 635. The restoration of wiper 820 also disconnects ground from the upper winding of cut-off relay 650 which however, is maintained operated over its lower winding until the units register switch U is fully released. The units register switch U opens its off-normal contacts 818 when the wipers are fully restored in response to the operation of release magnet 816. The opening of contacts 818 opens the circuits to all release magnets 816, 826, 836 and 846, and also opens the circuit through the lower winding of cut-off relay 650. Off-normal contacts 817 now close to prepare the series circuit thru the off-normal contacts 837 and 847 and when relay 650 restores, the circuit for marking the director idle is completed at back contacts 656 over conductors 593 and 594 for controlling the allotter relay 560. The director is now fully released and may again be allotted for use, when reset relay 590 in Figure 5 next operates.

*Outgoing call—exchange J to exchange C*

Let it now be assumed that subscriber C in exchange J desires to make a call to a subscriber in exchange C whose local number is "234," making the complete call number to be dialled "79234." Let it further be assumed that subscriber C is non-restricted as to outgoing calls, and that the EC terminal 14 in the line switch RLS associated with this line in Figure 4 is therefore left open.

When subscriber C removes his receiver, the line-switch RLS operates to select and seize an idle first selector such as FS, which returns dial tone in the usual manner. Upon hearing the dial tone, subscriber C proceeds to dial the call number "79234." In response to the first digit "7" selector FS raises its shaft and wipers to the seventh level where they are automatically rotated in search of an idle second selector, such as the selector SS. When the first selector FS has switched through to the second selector SS, line relay 430 in the latter switch is operated as before over the line loop circuit including contacts 421 and 423, contacts 412 and 414, conductors 50 and 53, wipers 20 and 23, wipers 16 and 19, and line conductors 10 and 11.

Line relay 430 upon operating over this circuit, at contacts 431 causes the operation of start relay 530 in the director finder in series with lockout relay 520 from ground at busy key contacts 478, by way of contacts 416 and 431, rotary off normal contacts 472, conductor 405 in cable 400, winding of relay 530, contacts 531 and 521, the start relay chain contacts, and the winding of relay 520 to battery. Line relay 430 also, at contacts 432 operates release relay 440 from ground at contacts 427, and at contacts 434 prepares a circuit to director start relay 410. Release relay 440 upon operating, at contacts 441 closes a point in the rotary circuit, and at contacts 442 grounds the test conductor 52 through busy key contacts 477 to hold the first selector, to clear the calling line of attachments at the lineswitch, and to busy the calling line at the connector by grounding this line's test conductor 12. Relay 440 also at contacts 443 prepares the vertical stepping circuit, and at contacts 445 closes another point in the circuit of relay 410, and completes a circuit to the lower winding of changeover relay 450 from ground at vertical off normal contacts 481. Relay 450 operates over this circuit, at contacts 451 prepares a circuit to the interrupter relay 460, and at contacts 454 starts the tone generator, not shown.

Start relay 530 upon operating from line relay 430 as previously described, at preliminary make contacts 532 locks operated independently of contacts 531 and 539 which open immediately thereafter to open the original circuit. Contacts 539 also open the operate circuits of all the start relays following it in the chain, while contacts 521 on lockout relay 520 which has also operated, completely open the start circuits of all of the associated start relays. Start relay 530 in addition, assuming all directors idle, at contacts 533 completes a circuit to connect relay 510, from ground at contacts 1063, by way of conductor 599 in cable 500 and contacts 591, 563 and 533. Start relay 530 further, at contacts 534 prepares a temporary locking circuit for connect relay 510, at contacts 535, 536 and 537 prepares circuits to the other connect relays 510 which circuits are now open at back contacts 563, 564 and 565, and at contacts 538 prepares a circuit for relays 410 and 640.

Connect relay 510 operating over the previously traced circuit through contacts 533, at preliminary make contacts 512 locks to contacts 534 and at contacts 511 shunts its own upper winding as well as the upper windings of the other connect relays 510 associated with the same director to prevent their operation. Relay 510 also, at contacts 513 and 514 extends the calling line loop to the line relay 610 of the first director, by way of conductors 402 and 403 in cable 400 and conductors 523 and 524 in cable 500, at contacts 515 and 516 prepares the outward pulsing circuit from the director to the selector SS, and at contacts 517 extends the restrict or extra control conductor 51 to the director but without effect as this conductor is open at the lineswitch of the calling line, as previously stated. Connect relay 510 further, at contacts 519' grounds the BY' conductor to mark this director busy to the test equipment of Fig. 10, at contacts 518 prepares a holding circuit for the director busy relay 640, and at contacts 519 completes an operating circuit for relay 640 in series with relay 410 as follows: ground at vertical off normal springs 481 in Fig. 4, contacts 445, 434 and 419, winding of relay 410, conductor 407 in cable 400, contacts 538 and 519, conductor 529 in cable 500, contacts 658 and the winding of relay 640 to battery.

Director start relay 410 in the selector operates over this circuit and at contacts 418 and 419 locks direct to ground and opens the original circuit from contacts 481. Relay 410 also, at contacts 417 removes selector ground from test wiper 493, at contacts 415 closes a second locking circuit for connect relay 510, and at contacts 416 releases start relay 530 and lockout relay 520. Relay 410 further, at contacts 411, 412, 413 and 414 disconnects line relay 430 from the calling line loop, and connects it instead to the director's outward pulsing contacts 959 by way of conductors 401 and 404 in cable 400, contacts 515 and 516, and conductors 525 and 526 in cable 500. The second selector's line relay 430 is now held and controlled from the director, while the director line relay 610 is held, as previously indicated, over the calling line loop. The director busy relay 640 also operates, in series with relay 410, at contacts 641 lights the director busy lamp BL from ground on the supervisory conductor 626, at break contacts 642 removes one of the multiple grounds from the all-directors-busy conductor 572, and at make contacts 642 and 643 prepares the time release circuits.

The director line relay 610 operates over the calling line loop, by way of contacts 513 and 514 on the connect relay, at about the same time as relay 640 operates, and at make contacts 611 operates release relay 620. Release relay 620 in turn, at contacts 621 prepares the inward pulsing circuit from relay 610, at make contacts 622 and 624 grounds the locking conductors 615 and 664, at contacts 623 prepares a circuit for interrupter relay 953, and at contacts 625 closes a second circuit to busy relay 640 from ground through relay 410 on conductor 407, through contacts 518 and conductor 528 in the cable 500, preparatory to the release of start relay 530. Release relay 620 further, at break contacts 622 removes locking ground from conductor 592 leading to the first allotted relay 560, thereby causing the release of this relay to preselect the next director.

The dialling of the second digit "9" of the call number accordingly causes the director line relay 610 to release and re-operate nine times. Back contacts 611 thereupon pass nine pulses to motor magnet 815 of switch U, by way of back contacts 674, 684, 694 and 604 and conductor 632, and wipers 810 and 811 of switch U are accordingly stepped to their 9th bank contacts. The slow to release transfer relay 630 operates on the first pulse, over its lower winding, and remains operated during the succeeding pulses of the digit. Relay 630 upon operating, at make contacts 631, causes the operation of motor magnet 825 of sequence switch SC, by way of back contacts 601 and conductor 618, and wipers 820 and 821 of this switch are accordingly advanced to their 1st bank contacts. Motor magnet 825 also, at contacts 829, energizes both windings of the differential kick-up relay 600 in opposition, preparatory to the operation of this relay.

Transfer relay 630 releases shortly after the last pulse, and at break-make contacts 631 prepares a circuit for the jumper field relays, and opens the circuit to the sequence switch motor magnet 825. Magnet 825 thereupon releases and at contacts 829 opens the circuit to kick-up relay 600. The unbalance of the resulting inductive surge through the windings of relay 600, due to the effect of the resistor K in series with the lower winding, is sufficient to close preliminary make contacts 603, and relay 600 operates completely, with both windings energized aiding and in series, from grounded conductor 615.

Kick-up relay 600 upon operating fully, at contacts 605 closes a circuit for the operation of the interrupter relay start relay 910, from ground on conductor 615, by way of conductor 667 and wiper 821 of the sequence switch in its 1st position. Relay 600 also, at contacts 604 disconnects the now open inward pulsing circuit from magnet 815 of the units switch U and connects it to magnet 845 of the hundreds switch H, at contacts 602 disconnects resistor K from the lower winding of kickup relay 600 and connects it to the lower winding of kickup relay 690, and at contacts 601 disconnects the now open make contact 631 from magnet 825 and connects it to the upper winding of relay 690. Relay 600 further, at contacts 607 disconnects the left hand winding of the restrict relay 770 and prepares a circuit for cut-off relay 650, and at contacts 606 completes a circuit for operating the jumper field relays 700 and 740 in series over the following circuit: ground at back contacts 631, contacts 606 and 696, conductor 612, left winding of relay 700, conductor 806, wiper 810 in its 9th position, conductor 804, and the left winding of relay 740 to battery.

Relays 700 and 740 both operate over this circuit, and lock over their right hand windings to ground on conductor 615. Contacts 706 also cause the operation of field relay 760, while contacts 704 and 741 prepare a circuit to the right hand winding of restrict relay 770, which is however ineffective, since the EC conductor 527 is not marked on this call, as previously stated. Other contacts on relays 740 and 760 prepare the office code translating circuits, and cause the immediate operation of the digit skip relay 940, over a circuit which may be traced as follows: ground from conductor 664 through contacts 931, conductor 850, wiper 820 in its 1st position, conductor 851, back contacts 773, make contacts 763 and 743, and conductor P to the upper winding of relay 940 and battery. Relay 940 thereupon operates, and at contacts 941 puts direct ground on conductor L1 to skip the first outgoing digit. Relay 940 further at contacts 943 shunts the pulsing contacts 959.

The interrupter relay start relay 910, having been made slow to operate and quick to release by means of a short circuited upper winding controlled by break contacts, operates after a slight delay, following the closure of its circuit from contacts 605 of kickup relay 600 as previously described. Relay 910 thereupon, at contacts 911 closes another point in the now disabled restrict circuit, and at contacts 913 energizes interrupter relay 953 from ground on conductor 615, through contacts 937, 928, 926, 913 and 936, conductor 639, contacts 623, conductor 638 and contacts 951. Relay 953 upon operating operates interrupter relay 955, which operates relay 950. Relay 950 then releases 953 which releases 955. Pulsing contacts 959 are now without effect due to being shunted by contacts 943, but counting relay 972 operates, upon the energization of relay 955, from ground on conductor 615, through contacts 937, 928, 957, 998, 985, 978 and 971.

Counting relay 972 upon operating over this circuit, at contacts 967 passes ground from contacts 941 through back contacts 964 to the upper winding of differential stop relay 920 which operates, and to both windings of differential stop relay 930, which does not operate. Stop relay 920 upon operating, at contacts 922 locks to conductor 664, at contacts 924 passes the ground from contacts 941 to interrupter relay 950 to hold this relay operated momentarily, and at contacts 928 opens the operate circuit of relay 953 to prevent its re-operation at this time. Contacts 928 also open the operate and locking circuits for counting relay 972 which restores. Stop relay 920 further, at contacts 921 causes the operation of motor magnet 825 whereupon the sequence switch SC advances its wipers 820 and 821 to the 2nd position. In this position start relay 910 is re-energized through wiper 821 and the bank multiple, while digit skip relay 940 is re-energized through wiper 820 by way of conductor 852, back contacts 775, make contacts 765 and 745 and conductor P.

Upon the release of counting relay 972, contacts 967 remove ground from the lower winding of stop relay 930 and from interrupter relay 950, whereupon relay 930 operates from its upper winding, while relay 950 restores. Relay 950 upon releasing, prepares the circuit for energizing interrupter relay 953, in readiness for restarting the interrupter relays. Stop relay 930 upon operating, at contacts 931 opens the operating circuit of digit skip relay 940 and closes its locking circuit in time to prevent the release of this relay, at contacts 932 releases motor magnet 825, and at contacts 933 connects ground from contacts 912 to conductor L7, which is however to be without effect at this time. Relay 930 also, at contacts 934 prepares a circuit to the lower winding of relay 920 and disconnects its own lower winding, at contacts 935 further opens the hold circuit of interrupter relay 950, and at contacts 938 closes an additional shunt across pulsing contacts 959, by way of conductor 677 and contacts 645 on the busy relay. Relay 930 further, at make contacts 937 and 936 causes the re-operation of interrupter relay 953 from ground on conductor 615, through make contacts 937, 927, 926 and 936, conductor 639, contacts 623, conductor 638 and contacts 951.

Interrupter relay 953 upon operating, again operates relay 955, which re-operates interrupter relay 950 and counting relay 972. Relay 955 also opens pulsing contacts 959 but this is again without effect due to these contacts being shunted at both contacts 938 and 943. Counting relay 972 at contacts 967 connects ground from contacts 941 to the lower winding of stop relay 920, through back contacts 964 and make contacts 934. Both windings of relay 920 being now energized in opposition, this relay releases. Contacts 923 and 925 of relay 920 thereupon extend the ground from contacts 941 to the upper winding of stop relay 930 and to interrupter relay 950, to hold these relays operated for the moment. Stop relay 920 also, at make contacts 926 further opens the alternative circuit to interrupter relay 953 now open at contacts 951, and at make contacts 927 opens the operate and locking circuits of the counting relays to again release counting relay 972. Relays 953 and 955 of course restore, following the operation of relay 950.

Upon the release of counting relay 972, make contacts 967 disconnect ground from contacts 941 from the upper and lower windings of stop relay 920 and from the upper winding of stop relay 930. Contacts 967 at the same time open the holding circuit to interrupter relay 950. Relay 950 then restores to re-prepare the circuit to relay 953. Stop relay 930 also restores and at contacts 931 opens the locking circuit of digit skip relay 940 and re-closes the operate circuit of this relay, through wiper 820 of the sequence switch and conductor 852. Stop relay 930 further, at back contacts 937 and 938 re-establishes the original circuit to interrupter relay 953 which to repeat, is from ground on conductor 615, through contacts 937, 928, 926, 913 and 936, conductors 639 and 638, and contacts 951.

Interrupter relays 953, 955 and 950 now re-operate in succession as before, with relay 955 re-operating counting relay 972. Contacts 967 on relay 972 then re-operate stop relay 920 over its upper winding. Relay 920 now locks as before through contacts 922, at contacts 824 closes the holding circuit of relay 950, and at contacts 921 re-operates magnet 825. The sequence switch SC accordingly advances its wipers 820 and 821 to the 3rd position, where a new circuit is established for skip relay 940 from ground on conductor 664, through back contacts 931, conductor 850, wiper 820, conductor 853, back contacts 777, make contacts 767 and 747, and conductor P through cable 800 to the upper winding of relay 940, which thus remains operated. Relay 910 also remains operated, through wiper 821. Stop relay 920 also, at contacts 928 causes the release of counting relay 972, which opens its contacts 967 and causes the re-operation of stop relay 930. Relay 930 then as before locks up relay 940, grounds conductor L7, releases magnet 825, releases relay 950, and prepares the alternative circuit to relay 953.

Upon the release of relay 950 therefore, the interrupter relay 953 again operates, and re-operates relay 955, which re-operates 950 and 972. Relay 972 then shunts down stop relay 920, which again holds 930 and 950 momentarily, and releases 972. Counting relay 972 upon releasing, permits relays 930 and 950 to restore and re-establish the original circuit for relay 953.

Upon the release of relays 930 and 950, interrupter relay 953 again operates, and re-operates 955, which re-operates 950 and 972 as before. Relay 972 then re-operates stop relay 920 from contacts 967. Relay 920 again holds relay 950 momentarily, and at contacts 921 re-operates magnet 825. Sequence switch SC thereupon advances its wipers 820 and 821 to their 4th position where new circuits are established for relays 910 and 940, the former relay remaining held through wiper 821 and the latter through wiper 820 over a circuit including back contacts 931, conductor 850, wiper 820, conductor 854, make contacts 769 and 749, and conductor P through the cable 800 to the upper winding of relay 940. Stop relay 920 further, at contacts 928 releases counting relay 972, which causes the re-operation of stop relay 930. Stop relay 930 again locks up relay 940, grounds L7, releases motor magnet 825, releases interrupter relay 950, and prepares the alternative circuit for relay 953.

Interrupter relay 953 now re-operates, following the release of relay 950, and re-operates 955, which re-operates 950 and 972. Counting relay 972 upon operating again bucks down stop relay 920, which again holds 930 and 950 momentarily and releases 972. Counting relay 972 then at contacts 967 removes the holding ground from relays 930 and 950, whereupon both of these relays restore and re-establish the original circuit for relay 953.

Interrupter relay 953 again operates, following the release of relays 930 and 950, and re-operates 955, which re-operates 950 and 972. Counting relay 972 then re-operates stop relay 920, from ground at contacts 941 through contacts 967. Stop relay 920 again holds relay 950 momentarily, and at contacts 921 again operates motor magnet 825. The sequence switch SC thereupon advances wipers 820 and 821 to their 5th position. In this position, the circuit of start relay 910 is still maintained through wiper 821, but the operate circuit of skip relay 940 is now open at wiper 820, and this relay accordingly restores. Stop relay 920 also releases counting relay 972 which re-operates stop relay 930. Relay 930 thereupon again releases motor magnet 825 and relay 950, grounds conductor L7, and prepares the alternative circuit for relay 953. In the foregoing operation, due to the relatively long follow action of back contacts 928 on relay 920, magnet 825 operates before counting relay 972 releases, to assure the release of skip relay 940 before 930 operates. Also, relay 955 releases before relay 940 releases, to assure the reclosure of pulsing contacts 959 before contacts 943 open.

Interrupter relay 953 now re-operates following the release of relay 950 and again operates 955, which again operates 950 and 972. The closing of contacts 967 by relay 972 is now without effect, due to the open contacts 941, and relays 920 and 930 remain operated. When therefore interrupter relay 950 operates, and releases interrupter relays 953 and 955, the latter relay releases 950 again, to re-operate 953. Relays 953, 955 and 950 thus continue to operate and release for seven full cycles, with pulsing contacts 959 opening and closing once each cycle. This is still without effect however, since contacts 959 are now shunted by contacts 938 and 645.

Upon the 1st release of interrupter relay 955 however, contacts 957 thereof open the operate circuit of counting relay 972, thus removing a ground shunt from counting relay 960, which accordingly operates in series with 972 and locks the latter operated over the following circuit: ground on conductor 615, make contacts 937 and 927, lower winding of relay 960, contacts 980 and 973, and the winding of relay 972 to battery. Upon the 2nd operation of relay 955, contacts 958 lock relay 960 operated momentarily over its upper winding while contacts 957 operate counting relay 976 by way of make contacts 961 and 969. Relay 976 at contacts 977 locks to conductor 615 through contacts 984, 927 and 937, and at contacts 980 unlocks and releases counting relay 972. Upon the 2nd release of relay 955 contacts 958 open the upper locking circuit of counting relay 960 which restores. Upon the 3rd operation of relay 955 counting relay 986 operates, from contacts 957 through back contacts 961 and contacts 979, and on the release of 955 relay 960 operates in series with 986, through contacts 994 and 987. Counting relay 976 restores, upon the operation of relay 986. Upon the 4th operation of relay 955, contacts 958 again close the upper locking circuit of relay 960, while contacts 957 operate counting relay 991, through make contacts 961 and 983. Relay 991 at contacts 990 locks to conductor 615 through contacts 997, 927 and 937, and at contacts 994 unlocks and releases counting relay 986. Relay 960 restores when relay 955 releases.

Upon the 5th operation of interrupter relay 955 counting relay 901 operates from contacts 957 through back contacts 961 and contacts 993, and at contacts 999 locks direct to contacts 957. Relay 901 also, at contacts 997 unlocks and releases counting relay 991, and at contacts 902 operates counting relay 966 which prepares a circuit for the counting changeover relay 963, now shunted by ground on both sides of its winding. When relay 955 releases however, relay 901 unlocks and restores, and at contacts 902 opens one side of the shunting circuit, whereupon relay 963 operates in series with relay 966 and locks the latter operated. Relay 963 at contacts 964 disconnects the circuit leading to the low numbered marking conductors L1 etc. and prepares a circuit to the high numbered marking conductors L6 etc.

Upon the 6th operation of interrupter relay 955, contacts 957 re-operate counting relay 972, through contacts 998, 992, 985, 978 and 971, and when relay 955 restores, counting relay 960 again operates in series with relay 972 and locks the latter operated as before.

Upon the 7th operation of relay 955 contacts 958 lock relay 960 momentarily, as before, and contacts 957 operate counting relay 976 by way of make contacts 961 and 969. Relay 976 thereupon at contacts 977 locks to conductor 615 through contacts 927 and 937, at contacts 980 unlocks and releases counting relay 972, and at contacts 975 connects ground from contacts 912 and 933 to the lower winding of stop relay 920, by way of make contacts 964 and 934. Both windings of relay 920 are therefore now energized in opposition and relay 920 restores. Relay 920 thereupon at contacts 925 holds interrupter relay 950 momentarily to prevent the re-operation of relays 953 and 955 following their release, and at contacts 927 unlocks and releases the counting relays 960 and 976. Relay 976 upon releasing opens contacts 975 to permit the release of stop relay 930 and interrupter relay 950.

Stop relay 930, at back contacts 931 marks the L9 conductor, and relays 920, 930 and 950 together re-establish the original circuit of interrupter relay 953 which now reoperates. The interrupter relays thereupon again start operating and releasing at pulsing speed, while contacts 959, being no longer shunted, open and close the outward pulsing loop to the line relay 430 of the selector SS, for each operation and release of relay 955. The counting relays count off nine steps, in the manner previously described, and on the 9th step, when counting relay 991 is operated for the second time, make contacts 989 close a circuit for stop relay 920, from ground through back contacts 931, over conductor 850 and wiper 820 of the sequence switch in its 5th position, conductor 855, make contacts 797 and 789, conductor L9 through the cables 800 and 900, make contacts 989 and 964, and contacts 923.

Stop relay 920 thereupon operates and locks, holds relay 950 to stop the pulsing, and unlocks and releases the counting relays. Relay 920 also, at contacts 921 again operates motor magnet 825 of the sequence switch, which now advances its wipers 820 and 821 to their 6th position, to prepare the sending of the final digits. Upon the release of counting relay 991, contacts 989 on this relay open the circuit to the lower winding of stop relay 930 whereupon the latter relay operates over its upper winding, while relay 950 restores. If the third digit has not yet been received by the director, relay 910 will restore when the sequence switch advances to the 6th position, to stop further outward pulsing.

In the selector SS, the line relay 430, in response to the nine pulses received from contacts 959 over the conductors 525 and 526 and the conductors 401 and 404, passes nine pulses to vertical magnet 480 which responds and raises the wipers 491, 492 and 493 to the 9th level, in the same manner as already described for a local call, with rotary interrupter relay 460 operating on the first step and changeover relay 450 releasing shortly after the last step. Rotary magnet 470 then operates from ground at contacts 442 and rotates the wipers in onto the 9th level of bank contacts, to which the trunks leading to exchange C are connected. If the first trunk is busy, magnet 470 and relay 460 will interact to drive the wipers across the bank, as long as wiper 493 encounters busying ground.

When an idle trunk to exchange C is found, test wiper 493 will no longer encounter ground, thus removing a shunt from around switching relay 420, and permitting the energization of this relay in series with relay 460, from ground at contacts 442, through cam springs 473, contacts 471 and vertical off normal springs 482. Relay 460 does not reoperate over this circuit, but relay 420 does operate. Switching relay 420 thereupon at contacts 421 and 423 disconnects the outward pulsing conductors 401 and 404 from line relay 430, and at contacts 422 and 424 extends them to the selected repeater such as repeater R4 in Figure 2, over line wipers 491 and 492 and cable 45. Switching relay 420 also, at contacts 425 opens its shunting connection, and at contacts 426 connects test wiper 493 direct to test conductor 52.

Upon the seizure of the repeater R4 as a result of the extension of the director outward pulsing loop thereto, this repeater seizes the associated repeater R3 at exchange C, and returns holding ground over test wiper 493 to hold the selector SS, the finder FS and the calling lineswitch RLS following the release of the selector line and release relays 430 and 440 as the result of the cut-through. Repeater R3 in turn seizes the associated incoming selector at exchange C, which is thus made ready to receive the next digit from the director.

When the calling subscriber dials the third digit "2" of the call number "79234," the director line relay 610 follows the pulses as before. Back contacts 611 accordingly now pass two pulses to motor magnet 845 of the hundreds switch H by way of back contacts 674, 684 and 694, make contacts 904 and conductor 634, and switch H thereupon steps its wiper 840 to its 2nd marking position. Transfer relay 630 operates as before over its lower winding on the first pulse, and at make contacts 631 energizes both windings of kick-up relay 690 in opposition, the circuit for the lower winding being now extended to resistor K, which unbalances the power in the windings slightly but not enough to operate relay 690. When transfer relay 630 restores however, shortly after the second pulse, the inductive kick through relay 690 causes it to close its contacts 693 and then to operate completely with both windings energized in series.

Kick-up relay 690 upon operating fully, at contacts 695 grounds conductor 668 leading to the sixth contact of the lower bank of the sequence switch SC, and at make contacts 694 prepares a circuit to motor magnet 835 of the tens switch T. Relay 690 also at make contacts 692 connects resistor K to the lower winding of kick up relay 680, and at make contacts 691 further prepares the circuit of relay 680, and prepares a circuit also to release magnet 816 of the units switch U.

When the calling subscriber dials the fourth digit "3" of the call number, line relay 610 again responds, and passes three pulses to motor magnet 835 of the tens switch T, by way of back contacts 674 and 684, make contacts 694 and conductor 633. Tens switch T thereupon steps its wiper 830 to its 3rd marking position. Transfer relay 630 operates as before on the first pulse, and at make contacts 631 energizes both windings of kick-up relay 680. A branch of this circuit also extends right from make contacts 691 to release magnet 816 of the units switch U, by way of contacts 653 and 686 and conductor 619. Release magnet 816 accordingly operates to release switch U, which returns its wipers 810 and 811 to their normal or home position in readiness for the last digit.

Upon the release of transfer relay 630, shortly after the third pulse, make contacts 631 open the circuit to kick-up relay 680 and to release magnet 816. Release magnet 816 accordingly releases, while the inductive surge through relay 680 causes it to operate in the same manner as relays 600 and 690. Relay 680 thereupon, at contacts 685 grounds conductor 669 leading to the seventh contact of the lower bank of the sequence switch, at make contacts 684 prepares a circuit to motor magnet 815 of the units switch U, at contacts 686 further opens the circuit to release magnet 816, and at make contacts 681 and 682 prepares a circuit for kick-up relay 670.

When the calling subscriber dials the fifth and last digit "4" of the call number, line relay 610 passes four pulses to motor magnet 815 of the units switch U, by way of back contacts 674, make contacts 684 and conductor 632. Switch U thereupon steps its wipers 810 and 811 to their 4th marking position. Transfer relay 630 operates as usual on the first pulse, and releases shortly after the last pulse. Upon the operation of relay 630, ground from make contacts 631 energizes both windings of kick-up relay 670, and upon the release of relay 630, the inductive kick causes relay 670 to operate and lock. Relay 670 thereupon, at contacts 674 disconnects the motor magnets of the marking switches H, T and U to prevent further operation, and at contacts 675 grounds conductor 676 leading to the eighth contact in the lower bank of the sequence switch.

It is thus seen that as long as the incoming digits keep ahead of the outgoing digits, a circuit is maintained for relay 910, through contacts 605, 695, 685, or 675, depending on the position of the sequence switch, whose position, in turn, is determined by the successive outgoing digits and the action of the counting relays. Otherwise, relay 910 will fall away, and if it does not re-operate before the end of the next inter-digital pause the director will stop, and wait until the next incoming digit is received, to re-close contacts 913. In this case also, the interdigital pause will be expanded to ten steps of the counting relays, instead of the usual seven, and stop relay 920 will operate from contacts 996.

The operation of stop relay 930 and the release of relay 950 following the sending of the office code digit "9" by contacts 959 to the second selector SS, again sets up the alternative circuit to interrupter relay 953 by way of make contacts 937, 927, 926, 936 and 623 and break contacts 951. The interrupter relays 953, 955 and 950 thereupon resume operation to fix the inter-digital pause. Pulsing contacts 959 are now without effect, due to the closed shunting contacts 938. The counting relays operate however, in response to the operations of relay 955 and count off seven steps, in the manner previously described, with relays 966 and 963 operating as before on the 5th step, and relay 976 for the second time on the 7th step. Immediately upon the operation of relay 976, contacts 975 thereof extend ground from contacts 912 and 933 through make contacts 964 to the lower winding of stop relay 920 which restores, holds relay 950, and releases relay 976. Stop relay 930 then restores, releases relay 950, and re-starts the interrupter relays. Relay 930 also, at back contacts 931 marks the L2 conductor with ground from conductor 664, by way of conductor 850, wiper 820 of the sequence switch, in its 6th position, wiper 840 of the hundreds marking switch in its 2nd position, and the cable 900.

The interrupter relays now operate and release twice, and operate counting relays 972 and 976. At the same time, pulsing contacts 959 pass two pulses to the repeater R4 and thence through the repeater R3 to the seized incoming selector at exchange C. The distant incoming selector thereupon raises its wipers to the second level, and then hunts on this level for an idle connector in the two hundred group. When such a connector is found, the incoming selector switches through in known manner, and extends the outward pulsing circuit to said connector.

Upon the operation of counting relay 976, contacts 974 thereof extend the marking ground on conductor L2 to the stop relays, and cause the operation of stop relay 920. Relay 920 upon operating holds relay 950 to stop the pulsing, and releases counting relay 976. Relay 920 also, at contacts 921 again operates motor magnet 825 of the sequence switch, which now advances its wipers 820 and 821 to their 7th marking position, to prepare the sending of the tens digit. Upon the release of counting relay 976, contacts 974 open, and cause the operation of stop relay 930 and the release of interrupter relay 950. The alternative circuit to interrupter relay 953 is thus again closed, and the interrupter relays again resume operation for the inter-digital pause, with relays 920 and 930 releasing as before, on the seventh step of the counting relays. Back contacts 931 now connect marking ground to the L3 conductor, by way of conductor 850, wiper 820 of the sequence switch in its 7th position, wiper 830 of the tens switch in its 3rd position, and the cable 900.

The interrupter relays now operate and release three times, and operate counting relays 972, 976 and 986 in succession, in the prescribed manner. At the same time, pulsing contacts 959 pass three pulses to the repeaters R4 and R3, and thence through the seized incoming selector at exchange C to the seized connector. The distant connector thereupon raises its wipers to the third level, in readiness for the receipt of the final digit.

Upon the operation of counting relay 986, contacts 981 thereof extend the marking ground on conductor L3 to the stop relays, for the operation of stop relay 920. Relay 920 then holds relay 950 to stop the pulsing, and releases counting relay 986. Relay 920 also, at contacts 921 again operates motor magnet 825 of the sequence switch, which now advances its wipers 820 and 821 to their 8th marking position, to prepare the sending of the units digit. Upon the release of counting relay 986, contacts 981 open to cause the operation of relay 930 and the release of relay 950. This again closes the alternative circuit to relay 953 and the interrupter relays start up again to count off the interdigital interval. On the seventh step of the counting relays, stop relays 920 and 930 release, in the previously described manner, whereupon back contacts 931 connect marking ground to the L4 conductor, by way of conductor 850, wiper 820 of the sequence switch in its 8th position, wiper 811 of the units marking switch in its 4th position, and the cable 900.

The interrupter relays now operate and release four times, and operate counting relays 972, 976, 986, and 991, one after the other, in the usual way. Pulsing contacts 959, at the same time, pass four impulses to the distant held connector, by way of repeaters R4 and R3 and the associated distant incoming selector. The distant connector in response, rotates its wipers four steps onto the contacts of the called line. The distant connector then rings the called line, and when the called station answers, connects it to the trunk.

Upon the operation of the counting relay 991 at the fourth pulse, contacts 988 of this relay extend the marking ground on conductor L4 to the stop relays, and operate stop relay 920. Relay 920 then holds relay 950 and releases relay 991. Relay 920 also at contacts 921 operates motor magnet 825 of the sequence switch, which advances its wipers 820 and 821 to their 9th position. Wiper 821 thereupon opens the circuit of relay 910 which restores, and opens its contacts 913. Wiper 820 at the same time closes a circuit to the upper winding of cut-off relay 650, from ground on the multiple 824, over conductor 617.

Cut-off relay 650 operates over this circuit and at contacts 655 locks momentarily to contacts 624. Relay 650 also, at contacts 651 starts the busy lamp BL flashing, to serve as a warning in case the director does not release properly, at contacts 654 prepares the release circuits of the marking and sequence switches, at contacts 656 opens another point in the circuit of allotter relay 560 to prevent premature re-operation of this relay, at contacts 658 further opens conductor 529, and at contacts 657 grounds conductor 528. This ground holds busy relay 640 momentarily, but shunts down director start relay 410 in the selector SS, which was locked in series with relay 640 over conductor 528 as previously described.

Director start relay 410 upon releasing, at contacts 411, 412, 413 and 414 disconnects the director outward pulsing conductors 401 and 404 from the wipers 491 and 492 and the distant connector, and connects the calling line, through conductors 50 and 53 thereto in their stead, thereby completing the connection between the calling and called lines, over the trunk. Relay 410 also, at contacts 418 disconnects ground from its in terminal, at contacts 417 closes another circuit between test wiper 493 and test conductor 52, and at contacts 415 disconnects locking ground from conductor 406, and thereby from connect relay 510, which releases. Relay 510 thereupon at contacts 511 removes the shunt from the other relays 510, at contacts 512 further opens its locking circuit, at contacts 519′, unbusies this director at the test equipment, and at contacts 513 to 519 disconnects the director from the second selector SS.

Line relay 610 and release relay 620 in the director now restore, whereupon make contacts 622 and 624 on the latter relay remove ground from conductors 615 and 664 thereby causing the release of the operated counting and interrupter relays, kick-up transfer relays, and jumper field relays. At the same time make contacts 625 open the circuit to busy relay 640 which releases, while back contacts 622 close a circuit to release magnets 826, 836 and 846 by way of conductor 592, off normal springs 818, 828, 838 and 848 in multiple, conductor 636, contacts 654 and conductor 635. A branch of this circuit also extends to the lower winding of cut off relay 640. The sequence and tens and hundreds marking switches now restore. Wiper 820 of the sequence switch now opens the circuit to the upper winding of relay 640 but this relay is now held operated over its bottom winding. At the same time off normal springs 827 on the sequence switch close a circuit to release magnet 816, from ground on conductor 592, by way of off normal springs 818, conductors 636 and 635 and springs 827. The units switch then releases, and upon the completion of this release, off normal springs 818 unlock and release cut off relay 640, and open the circuit of all of the release magnets, while off normal springs 817 prepare the circuit for the re-operation of allotter relay 560 associated with this director.

*Outgoing call—exchange J to exchange Q*

To call subscriber "234" in exchange Q, subscriber C would dial the call number "78234." Upon the dialling of the first digit "7," the first selector FS would again raise its wipers to the seventh level to seize an idle second selector SS and an idle director, in the manner already described. Upon the dialling of the second digit "8" the director line relay 610 operates transfer relay 630, and passes eight pulses to motor magnet 815 of the units switch, which accordingly steps its wipers 810 and 811 to their 8th position. Transfer relay 630, at make contacts 631 operates motor magnet 825 of the sequence switch, which advances wipers 820 and 821 to their 1st position, and energizes kick up relay 600, preparatory to its operation.

Upon the release of transfer relay 630 shortly after the last pulse, make contacts 631 release magnet 825, which causes the operation of kickup relay 600, in the manner previously described. Relay 600 thereupon at contacts 605 operates relay 910 to start the interrupter relays, and at contacts 606 operates the jumper field relays 700 and 730 in series over the following circuit: ground at back contacts 631, contacts 606 and 696, conductor 612, winding of relay 700, conductor 896, wiper 810 in its 8th position, conductor 803, and the winding of relay 730 to battery. Relay 700 on operating, operates relay 760, and the three relays lock up to conductor 615.

It will now be seen that conductors 851, 852, 853 and 854 are once again connected to the P conductor multiple, through make contacts on relays 730 and 760, and that conductor 855 is now connected to the L8 conductor. The digit skip relay 940 therefore operates at once, upon the operation of relays 730 and 760, from ground at back contacts 931, by way of wiper 820 and conductor 851, and make contacts 763 and 733. Digit skip relay 940 thereupon at contacts 941 prepares the digit skipping stop circuit and at contacts 943 shunts pulsing contacts 959.

The interrupter relay now cause the operation of counting relay 972, which closes contacts 967 to operate stop relay 920 in the usual way, and relay 920 steps the sequence switch to its 2nd position and releases counting relay 972. This causes the operation of stop relay 930 and the re-cycling of the interrupter relays. The second operation of the interrupter relays again operates counting relay 972, which closes contacts 967 to release stop relay 920. Relay 920 in turn, releases relay 972, which releases stop relay 930. The digit skip relay 940 is now held from wiper 820 of the sequence switch in its 2nd position, by way of conductor 852 and make contacts 765 and 735, and the foregoing action repeats for the 2nd, 3rd and 4th positions of wiper 820.

Stop relay 920 then advances the sequence switch SC to its 5th position, thereby causing the release of digit skip relay 940 as before. At the same time, relay 920 releases counting relay 972, which causes the operation of stop relay 930. Stop relay 930 then opens the L8 conductor at back contacts 931, grounds the L7 conductor at contacts 933, shunts the pulsing contacts 959, and re-starts the interrupter relays. The interrupter relays then operate through seven cycles, with counting relay 976 operating at the start of the seventh cycle to buck down stop relay 920 with ground through contacts 912, 933, 975 and 964. Relay 920 then releases the counting relays, which in turn release stop relay 930, which again grounds the L8 conductor, removes the shunt from pulsing contacts 959, and re-starts the interrupter relays.

The interrupter relay contacts 959 now pass eight pulses to the second selector SS in exchange J. The counting relays count off eight steps, and on the 8th step, when counting relay 986 is operated for the second time, contacts 982 on this relay close a circuit for stop relay 920 from ground through back contacts 931, by way of conductor 859, wiper 820 in the 5th position, conductor 855, make contacts 797 and 788, conductor L8 through the cables 800 and 900, and make contacts 982 and 964. Stop relay 920 thereupon operates to stop the pulsing, advances the sequence switch to its 6th position, and releases the counting relays. This causes the operation of stop relay 930 which again shunts the pulsing contacts 959 and re-starts the interrupter relays, to mark off the inter-digital interval.

In the second selector SS, the line relay 430 in response to the eight pulses received from the director's outward pulsing contacts 959, passes eight pulses to its vertical magnet 480, which thereupon raises its wipers 491, 492 and 493 to the 8th level. Interrupter relay 460 operates as before on the first step, and when changeover relay 450 releases, shortly after the last pulse, rotary magnet 470 steps the wipers in onto this level in search of an idle outlet to exchange Q. When such an outlet is found, switching relay 420 operates, and switches the outward pulsing conductors 401 and 402 through to the repeater associated with the selected outlet, such for example as the repeater R6 in Figure 2, by way of the selector line wipers 491 and 492, and the cable 55. Repeater R6 then returns holding ground, and seizes the associated repeater R5 at exchange Q. Repeater R5 in turn seizes the associated incoming selector at exchange Q, in readiness for the final digits.

Meanwhile, when the calling subscriber dials the final three digits of the call number "78234," the hundreds marking switch H is again stepped to its 2nd position, the tens marking switch T to its 3rd position, and the units marking switch U to its 4th position, the latter switch having been automatically restored to normal through the kick up relays as before, upon the dialling of the tens digit. The interrupter, counting, and stop relays of the director accordingly cooperate as in the previous call to send the digits "234" out over the seized trunk to exchange Q. The seized incoming selector at exchange Q responds to the first digit to select an idle connector in the proper hundreds group, and this connector in turn responds to the last two digits to select and signal the called station.

In the director, the completion of the sending of the final digit again advances the sequence switch to its 9th position, where wiper 820 again operates cut off relay 650. Relay 650 in turn, releases the director as before and shunts down start relay 410 in the second selector. Start relay 410 thereupon releases the director finder, and connects the calling party to the trunk to complete the connection, just as described for the previous call.

*Outgoing call—exchange J to exchange P*

To call subscriber "224" in exchange P, a subscriber in exchange J would dial the call number "81224." Upon the dialling of the first digit "8," the first selector FS involved, will step its wipers to the eighth level to seize an idle second selector SS and an idle director in the usual way, the second selectors being accessible, as indicated in Figures 2 and 3, from the sixth, seventh, and eighth levels of the first selectors. Upon the dialling of the second digit "1," the director line relay 610 operates transfer relay 630 and passes a single pulse to motor magnet 815 of the units switch, which thereupon steps its wipers to their 1st position. Transfer relay 630 upon operating, at contacts 631 operates motor magnet 825 of the sequence switch, which steps its wipers to their 1st position, and prepares the operation of kick-up relay 600, by energizing both its windings.

Transfer relay 630 releases, shortly after the last pulse and at make contacts 631 releases motor magnet 825, which opens the circuit of kick-up relay 600, causing the operation of this relay. Relay 600 upon operating, at contacts 605 operates relay 910 to start the interrupter relays, and at contacts 606 operates the jumper field relay 710 over the following circuit: ground at back contacts 631, contacts 606 and 696, conductor 612 to multiple 813 in the left bank of the units switch, wiper 810 in its 1st position, conductor 801, and the left winding of relay 710 to battery. Relay 710 upon operating over this circuit, locks over its right hand winding to ground on conductor 615. Relay 700 does not operate at this time, since its circuit is now open at the multiple 812 in the left hand bank of the units switch. And since relay 700 does not operate, relay 760 also remains normal.

With jumper field relay 710 operated and relays 700 and 760 normal, it will now be seen that the marking conductors 851, 852, 853 and 854 are once more connected to the B conductor multiple, through back contacts on relays 770 and 760 and make contacts on relay 710, and that marking conductor 855 is now connected to the L6 conductor, through back contacts 797 and make contacts 791. Digit skip relay 940 now operates, from ground at back contacts 931, over conductor 850, wiper 820 of the sequence switch, conductor 851, back contacts 773 and 763, make contacts 714, and conductor P through the cable 800. Relay 940 upon operating at contacts 941 prepares the digit skipping stop circuit as before, and at contacts 943 again shunts pulsing contacts 959.

When now, the calling subscriber dials the hundreds digit "2," the director line relay 610 pulses magnet 845, and steps the hundreds marking switch to its 2nd position to prepare a marking for the L2 conductor. At the same time the operation and release of transfer relay 630 causes the operation of kick-up relay 690. Similarly, the dialling of the tens digit "2" causes line relay 610 to pulse magnet 835 and step the tens switch to its 2nd position to prepare a second marking for the L2 conductor. The operation and release of transfer relay 630 at this time, operates a kick-up relay 680 and releases the units switch as before. The dialling of the units digit "4" then steps the units switch to its 4th position, to prepare a marking for the L4 conductor, and causes the operation of kick-up relay 670 from transfer relay 630.

When start relay 910 first operates, from ground through contacts 605 and wiper 821, the interrupter relays start operating, and operate counting relay 972. Make contacts 967 on this relay thereupon operate stop relay 920 from the ground at make contacts 941 to stop the interrupter relays. Relay 920 also steps the sequence switch to its 2nd position, and releases counting relay 972. This causes the operation of stop relay 930 and re-starts the interrupter relays. The second operation of the interrupter relays re-operates counting relay 972, whereupon contacts 967 cause the release of stop relay 920. The release of relay 920 again stops the interrupter relays and releases counting relay 972, while the release of relay 972 causes the release of stop relay 930 and the restarting of the interrupter relays.

The digit skip relay 940 is now held from wiper 820 of the sequence switch in its 2nd position, by way of conductor 852, back contacts 775 and 765 and make contacts 716, and the foregoing action repeats for the 2nd, 3rd and 4th positions of wiper 820. In the 3rd position, relay 940 is held over conductor 853 by way of back contacts 777 and 767 and make contacts 718, and in the 4th position it is held over conductor 854, through back contacts 769 and make contacts 781.

When stop relay 920 is operated for the fourth time, from counting relay 972, contacts 921 step the sequence switch and wipers 820 and 821 to their 5th position. This opens the circuit to the digit skip relay 940 which accordingly releases. Stop relay 920 also releases counting relay 972 as before to cause the re-operation of stop relay 930. Stop relay 930 then disconnects the regular marking ground at back contacts 931, at contacts 933 grounds the L7 conductor to set up the inter-digital interval, places its own shunt around pulsing contacts 959, and re-starts the interrupter relays. The interrupter relays now operate through seven cycles, with counting relays 966 and 963 operating as usual at the fifth cycle, and relay 976 for the second time at the start of the seventh cycle. Relay 976 thereupon passes the ground now on the L7 conductor through make contacts 975 and 964 to the stop relays, and causes the release of stop relay 920. Relay 920 releasing causes the release of the counting relays, which release stop relay 930. Stop relay 930 thereupon re-closes back contacts 931 to replace marking ground on wiper 820, removes the shunt from pulsing contacts 959, and re-starts the interrupter relays.

The interrupter relays now pass six pulses over conductors 525 and 526 to the second selector SS, and operate the counting relays. The counting relays thus count off six steps, with relays 966 and 963 operating as usual on the fifth step and relay 972 operating a second time on the sixth step. Counting relay 972 thereupon closes a circuit to the stop relays from digit-marking ground through back contacts 931, over conductor 850, wiper 820 of the sequence switch in its 5th position, conductor 855, back contacts 797, make contacts 791, conductor L6 through the cables 800 and 900, and make contacts 968 and 964. Stop relay 920 thereupon operates to stop the pulsing, advances the sequence switch and wipers 820 and 821 to their 6th position, and releases the counting relays. Stop relay 930 thereupon operates, replaces the shunt around pulsing contacts 959, re-starts the interrupter relays, and marks the L7 conductor to set up the inter-digital interval.

In the second selector SS the line relay 430, in response to the six pulses received from the director, over conductors 525 and 526, and 401 and 404, passes six pulses to the vertical magnet 480, which thereupon steps the wipers 491, 492 and 493 up to the 6th level. The rotary interrupter relay 460 operates as usual on the first step, and when the changeover relay 450 releases, shortly after the last step, rotary magnet 470 takes over, and steps the wipers in onto this level in search of an idle trunk to exchange P. When the selector has found an idle trunk, switching relay 420 operates and switches conductors 401 and 402 through to the repeater associated with this trunk, such for example as the repeater R7 in Figure 2, by way of contacts 422 and 424, wipers 491 and 492 and the cable 65. Repeater R7 upon seizure, returns holding ground to test wiper 493 and seizes the associated repeater R8 at exchange P. Repeater R8 then seizes an associated incoming selector at exchange P.

The director, after the usual inter-digital interval, now sends the hundreds digit as marked by the marking switch H, and advances the sequence switch SC to the 7th position. The distant incoming selector responds to this digit, repeated by the two repeaters, and selects an idle connector in the proper hundreds group. The director then sends the tens digit, as marked by the marking switch T, and advances the sequence switch SC to its 8th position. The distant connector responds to this digit and raises its wipers to the desired tens level. The director then sends the units digit as marked by the marking switch U, and advances the sequence switch SC to its 9th position. The distant connector in response to this digit, selects and signals the called line.

In the director, the arrival of the sequence switch SC at the 9th position, causes cut off relay 650 to operate as before from wiper 820. Relay 650 accordingly starts the release of the director, and shunts down start relay 410 in the selector SS. Start relay 410 thereupon releases the director-finder, completes the release of the director, and connects the calling party through to the trunk, in the same manner as previously explained. Thus, when the called station answers, the connection is complete, between the calling and called stations.

*Outgoing call—exchange J to exchange A*

To call subscriber "344" in exchange A, a subscriber in exchange J would dial the call number "66344." Upon the dialling of the first digit "6," the first selector FS assigned to the call steps its wipers to the sixth level, to seize an idle second selector SS and an idle director, in the manner already explained. Upon the dialling of the second digit "6," the director line relay 610 responds, operates transfer relay 630, and passes six pulses to magnet 815 of the units switch U, which accordingly steps its wipers to their 6th position. Transfer relay 630, at make contacts 631, operates motor magnet 825 of the sequence switch SC, which steps wipers 820 and 821 to their 1st position, and energizes both windings of kick-up relay 600, to prepare its operation.

When transfer relay 630 releases, shortly after the last pulse of the digit, make contacts 631 release magnet 825. Magnet 825 then opens the circuit of relay 600 which kicks itself operated. Relay 600 then, at contacts 605 operates relay 910 to start the interrupter relays, and at contacts 606 operates the jumper field relays 700 and 710 in series over the following circuit: ground at back contacts 631, contacts 606 and 696, conductor 612, winding of relay 700, conductor 806 to multiple 812 in the left bank of the units switch, wiper 810 in its 6th position, conductor 801, and the winding of relay 710 to battery. Relays 700 and 710 upon operating over this circuit lock through their right hand windings to conductor 615, and relay 700 also causes the operation of relay 760.

With jumper field relays 710 and 760 operated, it will be seen that the marking conductors 851, 852 and 853 are now connected to the "digit skip" conductor P, through back contacts on relays 770 and make contacts on relays 760 and 710, and that marking conductors 854 and 855 are now connected to the L6 conductor, through make contacts on relays 760 and 710. The digit skip relay 940 now operates, from ground at back contacts 931, over conductor 850, wiper 820 of the sequence switch in its 1st position, conductor 851, back contacts 773, make contacts 763 and 713, and conductor P through cable 800 to relay 940. Relay 940 thereupon, at contacts 941 prepares the digit-skipping stop circuit, and at contacts 943 shunts pulsing contacts 959.

When the calling subscriber dials the subscriber hundreds digit "3," the director line relay 610 pulses motor magnet 845 and steps the hundreds marking switch H to its 3rd position, to prepare a marking for the L3 conductor. The operation and release of transfer relay 630 from the pulsing circuit, also operates kick-up relay 690, to switch the pulsing circuit to the tens switch. When therefore, the calling subscriber dials the subscriber tens digit "4," the director line relay 610 pulses motor magnet 835 and steps the tens marking switch T to its 4th position, to prepare a marking for the L4 conductor. At the same time, the re-operation and release of transfer relay 630 from the pulsing circuit, releases the units switch, and operates kick-up relay 680, so that when the calling subscriber dials the units digit "4" line relay 610 again pulses motor magnet 815, and steps the units marking switch U to its 4th position, to prepare a second marking for the L4 conductor. At the same time, transfer relay 630 causes kick up relay 670 to operate, following the last pulse, and disconnects the pulsing circuit.

The operation of start relay 910, immediately following the closure of contacts 605 on the kick up relay 600, starts the interrupter relays. The first operation of the interrupter relays operates counting relays 972, whereupon make contacts 967 pull up stop relay 920 from ground at contacts 941 of the operated digit skip relay. Relay 920 then steps the sequence switch to its 2nd position, and releases relay 972. Stop relay 930 then operates, and, re-starts the interrupter relays. The second operation of the interrupter relays again operates counting relay 972 which now releases stop relay 920. Relay 920 in turn, releases counting relay 972, which releases stop relay 930, which re-starts the interrupter relays.

The digit skip relay 940 is now held from wiper 820 of the sequence switch in its 2nd position, over conductor 852, through back contacts 775, and make contacts 765 and 715, and the foregoing action repeats for the 2nd and 3rd positions of wiper 820. In the 3rd position, relay 940 is held from wiper 820 over conductor 853, through back contacts 777, and make contacts 767 and 717.

When stop relay 920 operates for the 3rd time, contacts 921 thereof advance the sequence switch SC another step to its 4th position. The circuit to the digit skip relay is thereby opened at the wiper 820, and this relay accordingly releases. Stop relay 920 also releases counting relay 972, which re-operates stop relay 930. Stop relay 930, at back contacts 931 disconnects the digit marking ground from wiper 820, at contacts 933 grounds the L7 conductor, at contacts 938 places its own shunt around pulsing contacts 959, and at make contacts 937 and 936 re-starts the interrupter relays. The interrupter relays now operate through seven cycles, with relays 966 and 963 operating at the fifth cycle and relay 976 for the second time at the seventh cycle. Relay 976 then passes the ground on conductor L7 through make contacts 975 and 964 to the stop relays, thereby causing the release of stop relay 920. The release of stop relay 920 causes the release of the counting relays, and this in turn causes the release of stop relay 930. Stop relay 930 then replaces the digit marking ground on wiper 820, removes the shunt from pulsing contacts 959, and re-starts the interrupter relays.

The interrupter relays now pass six pulses from contacts 959 to the second selector SS. The counting relays at the same time count off six steps, with relays 966 and 963 operating on the fifth step as before and relay 972 again on the sixth step. Counting relay 972 thereupon closes a circuit to the stop relays from ground through back contacts 931, by way of conductor 850, wiper 820 of the sequence switch in its 4th position, conductor 854, make contacts 769 and 719, conductor L6 through the cables 800 and 900, and make contacts 968 and 964. Stop relay 920 thereupon operates, stops the pulsing, advances the sequence switch to its 5th position, and releases the counting relays. Upon the release of the counting relays, stop relay 930 operates, replaces the shunt around pulsing contacts 959, re-starts the interrupter relays, and marks the L7 conductor direct to mark off the inter-digital interval.

In the second selector SS, the line relay 430 in response to the six pulses thus received from the director, passes six pulses to vertical magnet 480, which again steps wipers 491, 492 and 493 to the sixth level of their contact banks. Changeover relay 450 releases as usual shortly after the last pulse, to prepare the rotary circuit, whereupon rotary magnet 470 and the rotary interrupter relay 460 co-act to step the wipers into the sixth level in search of an idle trunk to exchange P. When the selector has found such a trunk, switching relay 420 switches conductors 401 and 402 through to the repeater such as R7 associated therewith, by way of wipers 491 and 492 and the cable 65. Repeater R7 then returns holding ground, and sezies an associated repeater R8 at exchange P, which in turn seizes an associated incoming first selector.

In the director, the interrupter and counting relays now step off the inter-digital interval, and on the seventh step, counting relay 976 releases stop relay 920, which releases the counting relays. The counting relays in turn release stop relay 930 which as before, replaces the digit marking ground on wiper 820, removes the shunt from pulsing contacts 959, and re-starts the interrupter relays.

The interrupter relays now pass six pulses from contacts 959 to the seized incoming selector at exchange P, by way of the selector SS, and the repeaters R7 and R8. The director counting relays at the same time again count off six steps, with relays 966 and 963 operating as usual on the fifth pulse, and relay 972 on the sixth pulse. Counting relay 972 thereupon again closes a circuit to the stop relays, from digit marking ground through back contacts 931, by way of conductor 850, wiper 820 of the sequence switch in its 5th position, conductor 855, make contacts 797 and 786, conductor L6 through the cables 800 and 900, and make contacts 968 and 964. Stop relay 920 thereupon again operates to stop the pulsing, advances the sequence switch to its 6th position, and releases the counting relays. Stop relay 930 then operates, replaces the shunt around pulsing contacts 959, re-starts the interrupter relays, and marks the L7 conductor for the inter-digital interval.

The incoming first selector involved at Exchange P, in response to the second digit "6" of the office code, as translated by the director at exchange J, raises its wipers also to the sixth level, and searches on this level for an idle trunk to exchange A. When such a trunk is found the incoming selector switches through and seizes the repeater such as the repeater R9 in Figure 3. Repeater R9 thereupon seizes the associated repeater R10 at exchange A, which in turn seizes an associated incoming selector in exchange A.

The director after sending the second digit six of the office code, again steps the counting relays seven steps to mark the inter-digital interval. On the seventh step, stop relay 920 restores to stop the interrupter relays. The counting relays then restore, and release stop relay 930, which re-starts the interrupter relays.

The director now sends the hundreds digit "3" and on the third step of the counting relays stop relay 920 operates from marking ground on conductor 850 through wiper 820 in its 6th position and wiper 840 in its 3rd position, and conductor L3 through the cable 900. The distant incoming selector in exchange A responds to this digit, and selects an idle connector, in the desired hundreds group. The stop relay 920 meanwhile, advances the sequence switch to its 7th position and releases the counting relays. Stop relay 930 then operates to shunt contacts 959 and re-start the interrupter relays for the inter-digital interval. At the end of this interval, the stop and counting relays again restore, to prepare the sending of the tens digit.

The director then sends the tens digit "4" as set up on the marking switch T, and on the fourth step of the counting relays, stop relay 920 operates from marking ground on conductor 850, through wiper 820 in its 7th position and wiper 830 in its 4th position, and conductor L4 through the cable 900. The distant connector in exchange A responds to this digit and steps its wipers to the fourth level to select the proper tens group. Stop relay 920 meanwhile, advances the sequence switch to its 8th position and releases the counting relays. Stop relay 930 then operates, for the inter-digital interval. At the end of this interval, the stop and counting relays again restore to prepare the sending of the final digit.

The director then sends the units digit "4" as set up on the marking switch U and on the fourth step of the counting relays, stop relay 920 again operates from marking ground on conductor 850, through wiper 820 in its 8th position and wiper 811 in its 4th position, to stop the pulsing and advance the sequence switch to its 9th position. The distant connector in response to the final digit, selects and signals the called line.

In the direction, the arrival of the sequence switch at its 9th position, causes cut off relay 650 to operate as before, from wiper 820. Relay 650 then starts the release of the director, and shunts down start relay 410 in the selector SS. Relay 410 then releases the director-finder, completes the release of the director, and connects the calling party through to the trunk, so that when the called party answers the desired connection is complete.

*Outgoing call—exchange J to exchange S*

To call subscriber "468" in exchange S, a subscriber in exchange J would dial the call number "65468." Upon the dialling of the first digit "6," the first selector FS assigned to the call steps its wipers to the sixth level, to seize an idle second selector and an idle director in exchange J, as before. Upon the dialling of the second digit "5" of the call number, the director line relay 610 in response, operates transfer relay 630 momentarily, and passes five pulses to magnet 815 of the units switch U, which now steps its wipers to their 5th position. Transfer relay 630 upon operating, operates motor magnet 825 of the sequence switch, which again steps wipers 820 and 821 to their 1st position, and prepares the operation of kick-up relay 600.

When transfer relay 630 releases shortly after the last pulse, it releases motor magnet 825. Magnet 825 then opens the circuit of relay 600 which kicks itself operated, and at contacts 605 operates relay 910 to start the interrupter relays. Relay 600 at the same time operates the jumper field relay 750 over the following circuit: ground at back contacts 631, contacts 606 and 696, conductor 612 to the multiple 813 in the left bank of the units switch, wiper 810 in its 5th position, conductor 805 and the winding of relay 750 to battery.

With jumper field relay 750 alone operated, it will be seen that the marking conductors 851 and 852 are now connected to the digit skip conductor P, through back contacts on relays 770 and 760 and make contacts on relay 750, that marking conductors 853 and 854 are now connected to the L6 conductor, and that marking conductor 855 is now connected to the L5 conductor. The digit skip relay 940 now operates from wiper 820 of the sequence switch in its 1st position, over conductor 851, back contacts 773 and 763, make contacts 754, and conductor P through the cable 800. Relay 940 again at contacts 941 prepares the digit skipping stop circuit, and at contacts 943 shunts pulsing contacts 959.

When the calling subscriber dials the third or "hundreds" digit "4" of the call number, the director line relay 610 steps the marking switch H to its 4th position. The operation and release of transfer relay 630 at the same time causes the operation of kick-up relay 690 as before, to extend the pulsing circuit to the tens switch. Upon the dialling of the fourth or "tens" digit of the call number therefore, line relay 610 steps marking switch T to its 6th position. Transfer relay 630 at the same time releases the units switch, and causes the operation of kick-up relay 680 to extend the pulsing circuit once again to the units switch. Upon the dialling of the fifth or "units" digit "8" of the call number therefore, line relay 610 steps the units switch U to its 8th position, while transfer relay 630 causes the operation of kick up relay 670.

When start relay 910 operates, following the closure of contacts 605 on relay 600, the interrupter relays start, and start the counting relays. The operation of the first counting relay pulls stop relay 920 from contacts 941. Relay 920 then steps the sequence switch to its second position, and releases the counting relays. Stop relay 930 then operates and re-starts the interrupter relays. The second operation of the first counting relay now releases stop relay 920, which releases the counting relays, which releases stop relay 930. Relay 940 is now held from wiper 820 of the sequence switch in its 2nd position, over conductor 852, through back contacts 775 and 765 and make contacts 756. The third operation of the first counting relay therefore again operates stop relay 920. Relay 920 thereupon advances the sequence switch to its 3rd position, and releases the counting relays, which again operate stop relay 930.

When the sequence switch is advance to its 3rd position, it removes ground from the P conductor and releases relay 940, to remove its marking from the L1 conductor. Stop relay 930 then disconnects the digit marking ground from wiper 820, marks the L7 conductor from contacts 933, and re-starts the interrupter relays. The counting relays now step off the inter-digital interval, and on the seventh step, with relays 966, 963 and 976 operated, ground from make contacts 933 passes through make contacts 975 and 964 and causes relay 920 to restore. Relay 920 then causes the release of the counting relays and of stop relay 930. Relay 930 then replaces the digit marking ground on wiper 820, removes the shunt from pulsing contacts 959, and re-starts the interrupter relays.

The interrupter relays now pass six pulses from contacts 959 over conductors 525 and 526 to the second selector SS. On the sixth step of the counting relays, stop relay 920 operates to stop the pulsing, from ground through back contacts 931 on conductor 850, through wiper 820 in its 3rd position, conductor 853, back contacts 777 and 767, make contacts 758, conductor L6 through the cables 800 and 900, and make contacts 968 and 964. Stop relay 920 also advances the sequence switch to its 4th position and releases the counting relays. Stop relay 930 then operates to re-start the interrupter relays, and again marks the L7 conductor for the inter-digital interval.

In the second selector SS, the line relay 430 in response to the first digit of the office code thus sent out by the director, passes six pulses to vertical magnet 400, which again steps wipers 491, 492 and 493 to the sixth level. The changeover relay 450 then releases, whereupon the rotary magnet 470 and relay 460 co-operate to step the wipers into the bank in search of an idle trunk to exchange P, such as that served by the repeaters R7 and R8 in Figures 2 and 3. When the selector wipers have made connection with this trunk, switching relay 420 operates and extends the outward pulsing circuit through line wipers 491 and 492 to the repeater R7. Repeater R7 then seizes the repeater R8 and the associated incoming first selector at exchange P.

Following the usual inter-digital interval, which restores the stop relays 920 and 930 to their normal position, the interrupter relays pass six pulses over conductors 525 and 526 to the seized incoming selector at exchange P. On the sixth step of the counting relays, stop relay 920 again operates to stop the pulsing, from ground on conductor 850 through wiper 820 in its 4th position, by way of conductor 854, back contacts 769, make contacts 785, conductor L6 through cables 800 and 900, and make contacts 968 and 964. Stop relay 920 in addition to stopping the interrupter relays, also advances the sequence switch to its 5th position, and releases the counting relays. Stop relay 930 then operates to re-start the interrupter relays, and again marks the L7 conductor for the inter-digital interval.

The seized incoming selector at exchange P, in response to the second digit "6" of the office code thus sent out by the director raises its wipers to the sixth level and searches for an idle trunk to exchange A, such for example as the trunk served by repeaters R9 and R10 in Figure 3. When the selector wipers have found this trunk, the selector then switches through and seizes the repeater R9, which in turn seizes the repeater R10 and the associated incoming first selector at exchange A.

The interrupter and counting relays now mark off the inter-digital interval, ending in the release of stop relays 920 and 930. The interrupter relays then pass five pulses over conductors 525 and 526 to the seized incoming selector at exchange A. On the fifth step of the counting relays, stop relay 920 again operates to stop the pulsing, from ground on conductor 850 through wiper 820 in its 5th position, by way of conductor 855, back contacts 797, make contacts 795, conductor L5 through cables 800 and 900, and make contacts 995 and back contacts 964. Stop relay 920 again stops the interrupter relays, advances the sequence switch to its 6th position and releases the counting relays. Stop relay 930 then operates as before to re-start the interrupter relays for the next inter-digital interval.

The seized incoming selector at exchange A, in response to the third digit "5" of the office code thus sent out by the director, raises its wipers to the fifth level and searches for an idle trunk to exchange S, such for example as that served by the repeaters R11 and R12 in Figure 3. When the selector wipers have found this trunk, the selector then switches through and seizes the repeater R11, which in turn seizes the repeater R12 and the associated incoming first selector at exchange S.

The interrupter and counting relays now mark off the inter-digital interval, followed by the release of the stop relays. The interrupter relays then pass four pulses, representing the subscriber "hundreds" digit to the seized incoming selector at exchange S which thereupon steps its wipers to the fourth level and selects an idle connector in the fourth hundreds group. On the fourth step of the counting relays, stop relay 920 operates from marking ground on conductor 850, through wiper 820 in its 6th position and wiper 840 in its 4th position, conductor L4 through cable 900, and contacts 988 and 964. Relay 920 then stops the interrupter relays, advances the sequence switch to its 7th position, and releases the counting relays. Stop relay 930 then operates as before to re-start the interrupter relays.

The interrupter and counting relays now mark off a new inter-digital interval, followed by the release of the stop relays. The interrupter relays then pass six pulses, representing the subscriber "tens" digit, to the selected connector at exchange S, which thereupon steps its wipers to the 6th level, preparatory to selecting the called line. On the sixth step of the counting relays stop relay 920 operates from marking ground on conductor 850, through wiper 820 in its 7th position and wiper 830 in its 6th position, conductor L6 through cable 900, and contacts 968 and 964. Relay 920 then stops the interrupter relays, advances the sequence switch to its 8th position, and releases the counting relays. Stop relay 930 then operates and re-starts the interrupter relays.

The interrupter and counting relays now mark off the final inter-digital interval, and the stop relays then release. The interrupter relays then pass eight pulses, representing the subscriber "units" digit, to the selected connector in exchange S, which thereupon rotates its wipers to the eighth contacts of the sixth level, to select the called line. On the eighth step of the counting relays stop relay 920 operates from marking ground on conductor 850, through wiper 820 in its 8th position and wiper 811 in its 8th position, conductor L8 through cable 900, and contacts 982 and 964. Relay 920 then stops the interrupter relays, and advances the sequence switch to its 9th position.

The arrival of the sequence switch at its 9th position causes cut off relay 650 to operate as in the previous calls, from wiper 820. Cut off relay 650 thereupon starts the release of the director and shunts down the director start relay 410 in the selector SS. Relay 410 upon releasing, releases the director-finder, completes the release of the director, and connects the calling party through to the trunk, in place of the director, and when the called station answers the connection between the calling and called parties is complete.

*Restricted service*

As previously indicated, there are three classes of subscribers or stations in this system; unlimited service stations, which can make calls to any exchange in the system; partially restricted stations, which can make calls to offices in the same district but not to the more distant exchanges; and fully restricted stations, which can make only local calls. The fully restricted stations have direct ground on their extra control terminal, as by cross connecting the terminals 15 and 14 in the associated line switch such as RLS in Figure 4, the partially restricted stations have ground through a resistance on their EC terminal, as by cross connecting the terminals 13 and 14, and for the non-restricted stations the EC terminal is left open. If a restricted station attempts a call outside of its classification, the restrict relay 770 in the director will operate and direct the call to a special terminal of the connector, which may then give busy tone, or otherwise notify the calling subscriber that the call has been denied. In Figure 1, offices C, Q and J are assumed to form one district, offices A and S a second district, and office P a third district.

*Full restriction*

It being remembered, that for a local call at exchange J the jumper field relays 760, 720 and 700 are operated, that on a call to exchange C the relays 760, 740 and 700 are operated, that on a call to exchange Q relays 760, 730 and 700 are operated, that on a call to exchange P only relay 710 is operated, that on a call to exchange A relays 760, 710 and 700 are operated, and that on a call to exchange S only relay 750 is operated, it will be shown that the restrict relay 770 will also operate to prevent completion of the call, should any fully restricted station attempt a call to another exchange.

On such an attempted call to exchange C for example, when the relays 760, 740 and 700 operate from wiper 810 as a result of the dialling of the second digit "9" of the call number to the director, relay 770 operates over the following circuit: direct ground on the EC terminal 14 of the calling line, the lineswitch EC wiper 17, the first selector FS and its EC wiper 21, conductor 51 through the cable 400, contacts 517 or the equivalent, conductor 527 through the cable 500 and across Figures 6 and 7 to the BY restriction terminal, through resistor B, make contacts 704 and 741, conductor 915, contacts 911, conductor 856, and the right hand winding of relay 770 to battery.

On an attempted call to exchange Q, from a fully restricted station at exchange J, when the jumper field relays 760, 730 and 700 operate from wiper 810 as a result of the dialling of the second digit "8" of the call number, restrict relay 770 again operates from the direct ground on conductor 527, by way of the resistor B and the BY terminal, make contacts 703 and 731, and conductors 915 and 856.

On an attempted call to exchange P from a fully restricted station at exchange J, when the jumper field relay 710 alone operates from wiper 810 as a result of the dialling of the second digit "1" of the call number to the director, restrict relay 770 again operates from the direct ground on the EC conductor 527, passing by way of the BZ terminal, back contacts 701, make contacts 711, and the conductors 915 and 856.

On an attempted call to exchange A from such fully restricted station at exchange J, when the jumper field relays 760, 710 and 700 operate from wiper 810 as a result of the dialling of the second digit "6" of the call number to the director, restrict relay 770 again operates from the direct ground marking on the EC conductor 527, passing by way of the BZ terminal, make contacts 701 and 711, and the conductors 915 and 856.

On an attempted call to exchange S, from such a fully restricted station at exchange J, when the jumper field relays 750 alone operates from wiper 810 as a result of the dialling of the second digit "5" of the call number to the director, restrict relay 770 again operates from the direct ground marking on the EC conductor 527, passing through the BZ terminal, back contacts 705, make contacts 751, and the conductors 915 and 856.

Restrict relay 770 upon operating, locks through contacts 772 to ground on conductor 615. Relay 770 also closes its make contacts 773, 775, 777 and 779. It will now be seen that marking conductor 851 is thus connected to the L2 terminal through make contacts 773, that marking conductors 852 and 853 are connected to open terminals through make contacts 775 and 777 and that marking conductor 854 is connected to conductor 617 to prepare a circuit for the cut off relay 650.

The interrupter relays 953, 955 and 950 also start, in the manner previously described, as a result of the dialling of the second digit of the call number to the director, following the advance of the sequence switch SC to its first position, and the subsequent operation of the kick up relay 600 and the start relay 910. The interrupter relays thereupon step the counting relays two steps, while pulsing contacts 959 pass two pulses to the held second selector SS. On the second step of the counting relays, stop relay 920 operates to stop the pulsing from ground through back contacts 931 on conductor 850, through wiper 820 of the sequence switch in its 1st position, conductor 851, make contacts 773, conductor L2, and contacts 974 and 964. Relay 920 then advances the sequence switch to its 2nd position and releases the counting relays. Stop relay 930 then operates and marks the L7 conductor for the inter-digital interval.

In the second selector SS, the line relay 430 in response to the digit "2" thus sent out by the director on all such calls, passes two pulses to vertical magnet 480, which accordingly steps the wipers 491, 492 and 493 to the second level. By reference to Figure 2 it will be seen that the second level of the selector SS and all of the other selectors give access to the connectors CS. When therefore the change-over relay 450 releases following the second pulse the rotary magnet 470 and the interrupter relay 460 co-act to step the wipers into the second level, to find and seize an idle connector in the two hundreds group.

The interrupter relays now step the counting relays seven steps to mark the inter-digital interval, and on the seventh step ground from contacts 912 and 933 passes through contacts 975 and 964 and releases stop relay 920, thereby releasing the counting relays and stop relay 930 in the manner already described. There being now no marking on any of the L1 to L9 conductors, due to marking conductor 852 being connected to an open office code terminal by make contacts 775, the interrupter relays now pass ten pulses over conductors 525 and 526 to the seized connector CS in exchange J. On the tenth step of the counting relays, stop relay 920 again operates, this time from direct ground through make contacts 996 and 964. Relay 920 thereupon stops the interrupter relays as before, advances the sequence switch to its 3rd position, and releases the counting relays. Stop relay 930 then operates as before and again marks the L7 conductor for the inter-digital interval. The connector CS, in response to the pulses, raises its shaft and wipers to the tenth level in known manner.

The interrupter and counting relays now step off another inter-digital interval, and on the seventh step of the counting relays stop relay 920 again restores to again release the counting relays and stop relay 930. As before, there is now no marking on the conductors L1 to L9, due to the marking conductor 853 being connected to an open office code terminal by make contacts 777, and accordingly the interrupter relays now pass another ten pulses to the held connector CS, over conductors 525 and 526. The counting relays therefore again count off ten steps, and on the tenth step, stop relay 920 again operates from direct ground through make contacts 996 and 964. Relay 920 thereupon stops the interrupter relays, and advances the sequence switch to its 4th position. The held connector CS, in response to the pulses, rotates its wipers to the tenth contacts of the tenth level.

Meanwhile, as soon as wiper 820 of the sequence switch reaches its 4th position, it closes a circuit to cut off relay 650 as follows: ground through back contacts 931 of the still unoperated stop relay 930 on conductor 850, wiper 820 in its 4th position, conductor 854, make contacts 779, conductor 617, and the upper winding of relay 650 to battery. Cut off relay 650 operates over this circuit, locks momentarily to ground at make contacts 624, and at contacts 657 shunts down director start relay 410 in the selector SS. The director-finder then releases, and causes the release of the director. The release of relay 410 in the second selector also connects the calling party through to the connector CS, and the calling party is then given a warning signal or connected through to an operator, according to the particular set up involved. Obviously, at offices with no operator present, a busy signal or other tone signal would most likely be provided.

*Partial restriction*

A partially restricted station at exchange J may make calls to the neighboring exchanges C and Q but not to the more remote exchanges P, A or S. If such a station wishes to call exchange C for example, the dialling of the second digit "9" of the call number will operate the jumper field relays 760, 740 and 700 in the usual way. Relays 700 and 740 then close an ineffective circuit to relay 770 from resistance ground on the EC terminal 14 of the calling line, the wipers 17 and 21, conductor 51, contacts 517, conductor 527, resistor B and the BY terminal, make contacts 704 and 741, conductor 915, make contacts 911 and conductor 856. Because of the extra resistance in the circuit, the restrict relay 770 cannot now operate as before, and the call goes through. The same thing takes place on a call from such a station to exchange Q, when the jumper field relays 760, 730 and 700 are operated.

On an attempted call to exchange P from such a partially restricted station at exchange J, the operation of the jumper field relay 710, as a result of the dialling of the second digit "1" of the call number to the director, closes a circuit to restrict relay 770 from the resistance ground marking on the EC conductor 527 extending by way of the BZ terminal, back contacts 701, make contacts 711, conductor 915, make contacts 911, and conductor 856. Since there is only one resistor in this circuit, namely, that connected to the EC terminal 14 of the calling line, relay 770 operates, and directs the call to the local connector "200" terminals, as explained for calls from a fully restricted station.

On an attempted call to exchange A, from such a partially restricted station at exchange J, the operation of the jumper field relays 760, 710 and 700, as a result of the dialling of the second digit "6" of the call number to the director, closes a circuit to restrict relay 770 from the resistance ground marking on the EC conductor 527 extending by way of the BZ terminal, make contacts 701 and 711, conductor 915, contacts 911, and conductor 856. There being only one resistor in this circuit, namely, the resistor connected to the calling line EC terminal 14, the restrict relay operates, and directs the call to the local connector terminal "200."

On an attempted call to exchange S, from a partially restricted station at exchange J, the operation of the jumper field relay 750 alone, as a result of the dialling of the second digit "5" of the call number to the director closes a circuit to restrict relay 770 from the resistance ground marking on the EC conductor, extended by way of the BZ terminal, back contacts 705, make contacts 751, and conductors 915 and 856. There being again only one resistor in the circuit, restrict relay 770 operates, and again directs the call to the local connector terminals "200."

*Unused office digits*

Should any station, inadvertently or otherwise, dial an unused office digit, such as, in the present instance, "2," "3" or "4," the restrict relay 770 will again operate, and direct the call to the local connector terminals "200" whereupon the calling party will be notified by signal or otherwise, of the non-completion of the call, just as for a barred call from a restricted station.

If a calling station at exchange J dials the office code digit "2" to the director, for example, the director line relay 610 in response, will drive the units switch U to its 2nd position. When therefore, the transfer relay 630 restores following the last pulse, and causes the complete operation of kick-up relay 600, the jumper field relay 720 is operated, over the following circuit: ground through back contacts 631, contacts 606 and 696, conductor 612 to Figure 8, the multiple 813 and wiper 810 in its 2nd position, conductor 802, and left winding of relay 720 to battery. The jumper field relay 720 in turn, closes a circuit to the restrict relay 770 as follows: ground from make contacts 622 on the conductor 615 to the BX restriction terminal, through back contacts 702, make contacts 721, and the conductors 915 and 856. There being no resistors in this circuit, restrict relay 770 operates, and directs the call to the local connector terminals "200" as before.

If the calling station dials the office code digit "3" as the second digit of the call number, the director line relay 610 in response advances the units switch U to its 3rd position. Shortly after the third pulse, transfer relay 630 restores in the usual way, and causes the operation of kick up relay 600 as before. Kick up relay 600 thereupon closes a circuit to the jumper field relay 730 as follows: ground through back contacts 631, contacts 606 and 696, conductor 612, the multiple 813 and wiper 810 of the units switch in its 3rd position, conductor 803, and the left winding of relay 730 to battery. The jumper field relay 730 accordingly operates, and closes a circuit to restrict relay 770 as follows: ground from conductor 615, the BX terminal in Figure 7, back contacts 703, make contacts 731, and the conductors 915 and 856 to the right hand winding of relay 770 and battery. Relay 770 then operates as before, and again directs the call to the local connector terminals "200."

If the calling station dials the digit "4" as the second digit of the call number, the director line relay 610 advances the units switch U to its 4th position. When the transfer relay 630 restores, shortly after the fourth pulse, and again causes the full operation of kick up relay 600, the latter relay closes a circuit to the jumper field relay 740 as follows: ground through back contacts 631, contacts 606 and 696, conductor 612, wiper 810 of the units switch in its 4th position, conductor 804, and the left winding of relay 740 to battery. Relay 740 accordingly operates, and closes a circuit to restrict relay 770 as follows: ground from conductor 615 on the BX terminal, back contacts 704, make contacts 741, and the conductors 915 and 856 to the right hand winding of relay 770 and battery. Relay 770 operates over this circuit, and again directs the call to the local connector terminals "200."

*Director test equipment*

To select a director for test, an attendant first sets the hand operated "select" switch HS of the test equipment to the desired position. To select the director DR shown in Figures 6, 7, 8 and 9 for example, the switch HS is moved to the left one step, onto the first set of contacts. If this director happens to be busy, ground from the operated connect relay in the director-finder of Figure 4 on the BY' conductor, will thereupon pass through the cable 500, back contacts 1011, the D1 conductor, wiper W1, and the busy lamp BYL, which lights. If the director is idle however, there will be no ground on the BY' conductor and the lamp BYL remains dark.

If the lamp indicates that the director is free the attendant then operates the "seize" key SK. This closes a circuit to the DSR relay 1010 from ground at key springs 1062, through wiper W2, the E1 conductor, the upper winding of relay 1010, back contacts 1011, conductor D1, wiper W1, and the lamp BYL to battery. The director seizing relay 1010 operates over this circuit, and at preliminary make contacts 1012 locks to ground at make springs 1063 on the seize key, through its lower winding. Relay 1010 also at make contacts 1011 connects the interrupter INT to the lamp BYL causing the latter to flash intermittently. Relay 1010 further at its lower make contacts connects the test equipment to the director. The director start relay 1030 in the test equipment thereupon operates in series with the busy relay 640 in the director over the following circuit: ground from make springs 1065 on the "seize" key, winding of relay 1030, back springs 1091 on the "pulse measuring" key PMK, make springs 1064, contacts 1013, conductor 529 through the cable 500, back contacts 658, and the winding of relay 640 to battery. The director line relay 610 also operates at the same time, over the following circuit: ground through the lower winding of relay 610, conductor 524 through cable 500, contacts 1014, springs 1066 on the release key RK, dial springs 1046, resistor L, contacts 1019, conductor 523 through cable 500, and the upper winding of relay 610 to battery. The attendant restores the seize key SK after the lamp BYL starts flashing. It will be seen that during the time the seize key is held operated break springs 1063 remove ground from conductor 599 to prevent interference through the operation of any connect relays 510 in the director finder at this time.

In the director, the operation of the line relay 610 causes the operation of release relay 620. Release relay 620 thereupon at make contacts 621 prepares the stepping circuit to the marker switches as before, at back contacts 622 releases the associated allotter relay 560 to prevent seizure of this director by other parties, and at contacts 625 closes an alternative circuit for busy relay 640 from ground through relay 1030, back springs 1091, contacts 1016, and conductor 528, in anticipation of the opening of the original circuit through springs 1064 upon the restoration of the seize key.

In the test equipment, the relay 1030 at contacts 1032 locks itself operated independently of the seize key. Relay 1030 also at make contacts 1031, 1034, 1035 and 1036 connects pulsing relay 1020 to the director outward pulsing circuit. Relay 1020 accordingly operates over this circuit which may be traced as follows: the outward pulsing contacts 959 in the director, conductors 525 and 526 to the test equipment, make contacts 1015 and 1018, make contacts 1031 and 1034, back springs 1093 and 1092, make contacts 1036 and 1035, and the windings of relay 1020 to ground and battery. Pulsing relay 1020 upon operating, operates release relay 1050. Release relay 1050 at make contacts 1051 prepares a pulsing circuit for motor magnet 1080 of the minor switch LS, and at contacts 1052 and 1053 lights the inter-digital pause lamp PL, by way of back contacts 1061 and 1071.

The director may now be tested for sending out the correct digits by dialling any call number desired, less the first digit, on the dial or calling device CD. The director line relay 610 responds to the pulses just as for a normal call, to set the jumper field relays and the marker switches, while the interrupter relays send back the translated office digits and the subscriber digits over conductors 525 and 526 to the test equipment pulsing relay 1020. On each release of pulsing relay 1020, a circuit is closed to motor magnet 1080 which pulses in response and steps wiper 1082 across its bank. Transfer relay 1060 operates on the first pulse, in parallel with magnet 1080 and operates transfer relay 1070. Relay 1070 thereupon opens the circuit of the lamp PL which goes dark. Relays 1060 and 1070 being made slow to release remain operated until the last pulse of the digit when they release, in succession, after short delays. Release relay 1050 on the other hand remains operated during all of the pulsing.

When the transfer relay 1060 restores, shortly after the last pulse of the first digit received from the director, back contacts 1061 close a circuit to a digit lamp such as LP1 connected to the bank contact on which wiper 1082 is now standing. The stated lamp accordingly lights momentarily, from the ground at make contacts 1053, through back contacts 1061 and make contacts 1071, to indicate the value of the first digit. When transfer relay 1070 also restores, shortly after relay 1060, this lamp is extinguished, and lamp PL lights from back contacts 1071, to mark the interdigital interval. Back contacts 1071 at the same time close a circuit through the off normal springs ON1, which closed on the first step of the switch LS, to the release magnet 1090. Magnet 1090 accordingly operates, and releases the switch LS.

The foregoing sequence of operations is repeated for each digit thus received from the director, and the number received is readily checked by watching the lamps LP. The length of the interdigital pause can also be checked, by observing the lamp PL, which goes dark at the start of each digit, and lights again at the end of each digit. After the last digit has been sent, the director sequence switch SC advances to its 9th position, and wiper 820 grounds conductor 617 to operate the cut off relay 650. Relay 650 thereupon releases the director in the manner already described, and at contacts 657 shunts down director start relay 1030 over the conductor 528. Relay 1030 upon releasing, releases relays 1010, 1020 and 1050, to restore the test equipment to normal.

In the foregoing test, the dialling to the director line relay 610 was over a simulated 1,200 ohm line loop, represented by the resistor L shown connected between the bottom pulsing contact of the dial CD and the conductor 523. The same test can be made using a loop with a 10,000 ohm shunt by operating the shunt key SHK before dialling. The upper springs 1071 of this key thereupon shunt out the 1,200 ohm resistor L, while the lower springs 1072 connect the 10,000 ohm resistor M across the dial pulsing contacts 1046.

The restriction features of the director may also be tested, through the operation of the restrict keys FK and PK before dialling. With the "full restriction" key FK operated, direct ground is placed on the EC conductor 527, and the director should therefore return the digits "2-0-0" in response to any digits dialled except those indicative of a local call. With the "partial restriction" key PK operated, resistance ground is placed on the EC conductor 527, and the director should return the digits "2-0-0" in response to any digits dialled indicative of a tandem outgoing call, or a call outside of a given area.

To test the pulse ratio of the director pulses, the director is seized in the manner described, after which the pulse measuring key PMK is operated. Make springs 1091 on this key thereupon lock up relay 1030 from battery through the resistor N, while break springs 1091 disconnect ground from conductor 528 thereby causing the release of the director busy relay 640. At the same time, break springs 1092 and 1093 on the key disconnect pulsing relay 1020 which restores, while make springs 1092, 1093 and 1094 close a circuit to the milliammeter MA. This circuit is from ground through make springs 1094 and 1093, make contacts 1031 and 1015, conductor 526 to the director outward pulsing contacts 959, conductor 525, make contacts 1018 and 1034, make springs 1092, the TA terminal, break springs 1074, resistor C, the potentiometer Y and the arm 1047, the milliammeter MA and the resistors A and B′, the arm 1048 and the potentiometer S, and the resistor E to negative battery. Make springs 1094 at the same time connect a potential cross the potentiometer S through the terminal TB and the resistors F and E. The current flowing through the milliammeter should cause a full scale deflection of the needle.

Upon the release of relay 640 in the director, make contacts 645 of this relay open a point in the pulse shunting circuit normally controlled by the stop relay 930 at contacts 938. At the same time break contacts 644 close a start circuit to the interrupter relays which may be traced as follows: ground from conductor 615 through back contacts 937, 928 and 926, conductor 665, contacts 644, conductor 663, back contacts 936, conductor 639, make contacts 623, conductor 638, and break contacts 951 to battery through relay 953. The interrupter relays 953, 955 and 958 thereupon start operating and releasing in succession in the manner previously described.

There having been no inward dialling, the jumper field relays, and relays 910 and 940 remain un-operated, and the stop leads L1 to L9 remain ungrounded. The interrupter relays therefore continue to operate. The counting relays count the operations as before, and on the tenth cycle of the counting relays, with relays 901, 966 and 963 operated, ground through make contacts 996 and 964 operates stop relay 920. Relay 920 stops the interrupter relays momentarily, and releases the counting relays. The counting relays then release, and cause the operation of stop relay 930 in the usual manner. The interrupter relays then resume operating, and continue for ten more cycles, with the counting relays following as before. On the tenth step of the counting relays ground through make contacts 996 and 964 causes the release of stop relay 920. Relay 920 again stops the interrupter relays momentarily, and releases the counting relays. Stop relay 930 then releases, and re-starts the interrupter relays, and the entire cycle of operations repeats, as long as desired.

Upon each operation and release of interrupter relay 955, pulsing contacts 959 open and re-close the circuit to the meter MA. Due to the open contacts 645, the shunting contacts 938 on stop relay 930 are without effect on these pulses, which thus continue without interruption, with only an almost imperceptible pause during the change over period at the end of each ten pulses. The average current now flowing through the milliammeter MA is therefore proportional to the per cent make of the pulsing contacts 959. The meter needle accordingly drops back to this value, which is read directly as a percentage on the special scale provided. Due to the continuous nature of the pulses, and the normal inertia of the moving system, the needle holds quite steady at this value.

The speed of the pulses may also be measured, while the "pulse measuring" key PMK is operated, by operating the "speed" key SPK. The break-make springs 1074 thereupon disconnect the outward pulsing circuit from the resistor C and the potentiometer Y and connect it to the speed relay 1040 which promptly operates over the following circuit: ground through make contacts 1094, 1093, 1031 and 1015, conductor 526, pulsing contacts 959, conductor 525, make contacts 1018, 1034, 1092 and 1074, and the winding of relay 1040 to battery. Speed relay 1040 upon operating at make contacts 1041 shunts the condenser CB and closes a charging circuit through the condenser CA as follows: ground from make springs 1073, condenser CA, resistor D, make contacts 1041, the meter MA, resistors A and B', arm 1048, potentiometer S, and resistor E to battery.

Speed relay 1040 now follows the pulses coming back from the director, and releases and re-operates in accordance with the position of the outward pulsing contacts 959. Upon each release of relay 1040, back contacts 1041 shunt condenser CA causing its discharge through the resistor D, while at the same time a charging circuit for condenser CB is closed from ground at springs 1073, through back contacts 1041, resistor D, condenser CB and the meter MA. Upon each re-operation of relay 1040 on the other hand, make contacts 1041 shunt condenser CB causing it to discharge through the resistor D, while at the same time a charging circuit for condenser CA is closed from ground at springs 1073, through CA, the resistor D, make contacts 1041, and the meter MA.

It is thus seen that one condenser is charged during the break period of the pulse, and the other during the make period, and that while one condenser is charging, the other is discharging. Since both charging currents also flow through the meter, and since the only interruptions are due to the changeover time of the contacts 1041, the average current through the meter is now proportional to the speed of pulsing, without regard to the pulse ratio. The meter needle accordingly comes up to and holds steady at this value which may be read on the scale as pulses per second.

A director under test can be released at any time by operating the release key RK momentarily, after restoring any other operated keys in the test equipment to their normal position. Upon the operation of the release key, break springs 1066 disconnect conductor 524 leading to the director line relay 610. Relay 610 accordingly releases and releases the director. Relay 1030 then also releases and restores the test equipment to normal.

*Director time release*

In case dialling does not follow seizure of the director, or if dialling is not completed, the interrupter, after an interval, will ground conductor 628 momentarily and operate time pulse relay 660, which locks. The interrupter then, after a further interval grounds conductor 629 momentarily. If some dialling has occurred, this pulse will pass through make contacts 661 and 607 and will operate cut-off relay 650 to release the director immediately. If no dialing has occurred, relay 600 will be normal, and the second time pulse will pass through back contacts 607 and operate restrict relay 770 and transfer relay 630 in series. Relay 630 will operate and restore magnet 825 to pull up relay 600 and start the interrupter relays. Since relay 770 is now locked operated, the director proceeds to send out the digits "200" and then releases, in the manner previously explained.

What is claimed is:

1. In a telephone system having a plurality of exchanges connected in tandem, a plurality of first and second selectors in one of said exchanges, a plurality of directors common to said selectors for passing trains of impulses to said second selectors in response to different trains of dialled impulses from said first selectors for extending calls to called lines in any of said exchanges, and a relay type director-selector common to said selectors and directors for selecting idle ones of said directors for use in rotation.

2. In a telephone system having a plurality of exchanges connected in tandem, a plurality of first and second selectors in one of said exchanges, a plurality of directors common to said selectors for passing coded trains of impulses to said second selectors for extending calls to called lines in any of said exchanges in response to dialled pulses, and means common to said selectors and directors for preselecting idle ones of said directors and for seizing such directors for use from any of said first selectors in response to the extension of a call through such first selector.

3. In a telephone system having a plurality of exchanges connected in tandem and each including a plurality of switches for extending local calls and inter-office calls in response to dial pulses, directors in said exchanges for operating said switches to extend a call from a local calling line to a called line in any of said exchanges including the calling exchange in response to dialled call numbers comprising office identifying digits and line selecting digits, and circuit means for seizing and operating said switches independently of said director to extend a call from a local calling line to a local called line in response to a dialled call number comprising only the line selecting digits of the called line's call number and excluding any of said office identifying digits.

4. In a telephone system including trunk lines and local lines, a penultimate group selector having a register-sender and a connector accessible thereto, a final group selector, means for operating said penultimate selector and said register-sender in response to a number of dialled digits including office selecting digits and line selecting digits to direct a call through said final selector and one of said trunk lines to a distant called line, means for operating said penultimate selector and said register-sender in response to an equal number of dialled digits including at least one different office selecting digit to direct a call through said final selector and said connector to a local called line, and means for operating said penultimate selector and said connector in response to a lesser number of dialled digits to direct a call through said penultimate selector and said connector to a local called line independently of said register-sender.

5. In an automatic telephone system, a plurality of exchanges connected together in tandem, a translating register-sender in one of said exchanges including a single-digit office register, and circuits in said register-sender for directing calls from said one exchange to any one of the other exchanges of the system by sending out variable number of digits in response to a single office digit received by said register sender and set up on said office register.

6. In a telephone system, a group of exchanges connected together in tandem, a director in one of said exchanges including an office register and a sender, said office register being set directively by means of a single office selecting digit dialled from a local calling line, and circuits in said director operated in response to such single dialled digit to cause said sender to send out one or a plurality of office selecting digits to direct the call to any exchange in the system, in accordance only with the value of said single dialled digit.

7. In a telephone system, a number of exchanges connected together in tandem, a director in one of said exchanges comprising an office register settable responsive to a single dialled office selecting digit and a numerical register settable responsive to a plurality of dialled line selecting digits, a sender in said director responsive to said dialled digits and the setting of said office-register for sending out one or several office selecting digits, and means for then causing said sender to send a plurality of line selecting digits in accordance with the settings of said numerical register to direct a call from a calling line in said one exchange to a called line in any of said other exchanges.

8. In an automatic telephone system comprising a number of offices connected together in tandem, a first and a second selector and a director in one of said exchanges, a calling line, means responsive to the first digit dialled over said calling line for causing said calling line to be extended through said first selector to said director, and an office register and a sender in said director responsive to the second digit dialled over said calling line for sending out one or several digits depending on the value of said second digit for directing the call through said second selector and to any desired one of said other exchanges.

9. In an automatic telephone system comprising a number of offices connected in tandem, a first and a second selector and a director in one of said offices, a calling line in said one office having two line conductors, two-conductor inward and outward pulsing circuits for said director, means responsive to the first digit of a call number dialled over said calling line to said first selector for causing said line conductors to be extended through said first selector to said inward pulsing circuit and for causing said outward pulsing circuit to be extended to said second selector, means in said director responsive to the second digit of the call number dialled over said calling line to said inward pulsing circuit for sending out one or more series of impulses over said outward pulsing circuit to cause said outward pulsing circuit to be extended through said second selector to any other of said offices, and means in said director responsive to the remaining digits of the call number for sending out further series of impulses over said outward pulsing circuit to cause said calling line to be extended to a called line in such other office.

10. In a director responsive to a single office selecting digit and a plurality of succeeding line digits, a plurality of digit registers, circuits for individually setting said registers in response to receipt of said digits, means for using one of said registers both as the office digit register and as a line digit register, a sender, circuits for causing said sender to send a plurality of digits in response to the first setting of said one register, and circuits for causing said sender to send a single digit in response to the second setting of said one register.

11. In a director, an office digit register and coder comprising a directively controlled switch and a group of coding relays, a group of line digit registers less in number than the incoming line digits required, means for operating said office register to set said coding relays in response to a group of office-selecting dialled pulses, means for operating said line digit registers in response to subsequent groups of line-selecting dialled pulses, means for releasing and re-operating said office register for re-use as a line digit register in response to said subsequent line-selecting dialled pulses, an impulse sender operated in accordance with the setting of said coding relays and registers to send out groups of impulses, and means for causing said sender to translate said office-selecting group of impulses into a different group or groups of impulses.

12. In a director responsive to dialled call numbers comprising a single office-selecting digit and a plurality of line-selecting digits, a translating register, a coding device, a plurality of non-translating registers, means responsive to the receipt of the office-selecting digit for operating said translating register to set said coding device, means responsive to the receipt of the first line selecting digits for operating the corresponding non-translating registers and for releasing said translating register, and means for re-operating said translating register as a non-translating register in response to the receipt of the final digit of the call number.

13. In a director responsive to dialled call numbers comprising an office selecting digit and a plurality of line selecting digits, a coding register and a plurality of non-coding registers, an incoming digit sequence switch and an outgoing digit sequence switch, a sender, means responsive to the receipt of said office selecting digit for operating said coding register and both of said sequence switches to cause said sender to operate for an interval to send out one or more coded digits, and means responsive to the receipt of each successive line selecting digit for operating one of said non-coding registers and for maintaining said sender in operation for an additional interval to send out an additional digit.

14. In a director having a plurality of registers set by incoming digits, a sender, pulsing contacts for said sender for re-transmitting said digits and other digits in acccordance with the setting of said registers, a pair of stop relays, means for operating said stop relays in succession from said registers at the end of each outgoing digit, means responsive to the operation of one of said relays for stopping said sender momentarily, means responsive to the operation of the other of said relays for re-starting said sender and shunting said pulsing contacts, means for releasing said relays in succession after a given number of operations of said sender to mark off the inter-digital interval, means responsive to the release of one of said relays for again stopping said sender momentarily, and means responsive to the release of the other relay for re-starting said sender and removing said shunt.

15. In a director having a plurality of registers set by incoming digits, a sender having pulsing contacts for sending out a greater or lesser number of digits up to a given maximum, in response to said incoming digits and the setting of said registers, means for starting said sender intermittently to mark the start of each possible outgoing digit including unused digits, and for likewise marking the start of each interdigital interval, means for stopping said sender after a variable number of operations thereof to terminate a used outgoing digit, means for stopping said sender after a fixed number of operations thereof to terminate the interdigital interval following a used outgoing digit, means for stopping said sender after a single operation thereof to pass by an unused digit, means for stopping said sender after a single operation thereof to terminate the interdigital interval following an unused digit, and means for disabling the pulsing contacts whenever said sender is operated to mark an unused digit or an interdigital interval.

16. In a telephone call director utilizing a single-digit office register, a group of coding relays less than ten in number for said register, means responsive to a single incoming office-selecting digit for operating and setting said relays in ten different combinations depending on the value of said digit, and a sender operated in response to said incoming digit for sending out various numbers and values of digits in ten different combinations depending on the setting of said relays.

17. In a call director as in claim 16, an intercept relay, means for operating said intercept relay from said coding relays in cases where said coding relays have been set in a combination corresponding to an unassigned office selecting digit, and means responsive to the operation of said intercept relay for causing said sender to send out a special combination of digits and for then immediately releasing said director.

18. In a telephone system, a plurality of offices, a call director in one of said offices, a group of coding relays in said director, means responsive to an office selecting digit dialled from a calling line in said one office for operating and setting said relays in ten different combinations depending on the value of said digit, a sender in said director operated in response to such digit for sending out different combinations of digits in accordance with the setting of said relays for directing calls to the other offices, a control conductor for each calling line, an intercept relay for said director, means responsive to the operation of said relay for causing said sender to send out a special combination of digits in place of the digits normally set up by the operation of said coding relays, means for operating said intercept relay from the operated coding relays in case there is no office corresponding to the said dialled office-selecting digit, and means for operating said relay from said control conductor and the operated coding relays in cases where the call is from a line restricted from calling the office corresponding to the dialled office-selecting digit.

19. In a telephone system, a number of offices connected in tandem, a call director in one of said offices, a group of coding relays in said director, intercept contacts on said relays, means responsive to an office selecting digit dialled from a calling line in said one office to said director for operating and setting said relays in different combinations depending on the value of said digit, a sender in said director operated in response to said digit for sending out different combinations of digits dependent on the setting of said relays for routing calls to the other offices, an intercept conductor and an intercept relay in said director, means responsive to the operation of said intercept relay for causing said sender to send out a special combination of digits in place of the digits normally set up by the operation of said coding relay, means for marking said control conductor from a calling line with a direct potential or with potential through a resistance to mark fully restricted and partially restricted lines respectively, means for extending said markings through the intercept contacts of the operated coding relays on all outgoing calls, means for extending said markings through a resistance associated with certain of said contacts on calls to certain offices, to cause said intercept relay to operate on calls to such offices only in case the control conductor is marked with direct potential to indicate a call from a fully restricted line.

20. In a telephone system, outgoing trunks, a two-motion second selector having access to said trunks, a calling line, a first selector and a call director, means for seizing said second selector through said first selector in response to the first digit of a call number dialled from said calling line, means responsive to such seizure for seizing said director and transferring the control of said second selector to said director, means normally responsive to the dialling of the second digit of the call number for causing said director to operate said second selector to select a trunk, means responsive to said second digit being dialled before the seizure of said director has been effected for operating said second selector in its first movement direct from said calling line to prevent such seizure, and means for then operating said selector automatically in its second movement to its extreme posiiton for returning a busy signal to said calling line.

21. In a telephone system, a two-motion second selector having ten-step vertical and rotary movements, outgoing trunks accessible to said selector, subscriber lines, a first selector, a group of directors, means in said first selector responsive to the dialling of the first digit of a call number thereto from a calling line for seizing said second selector by extending said calling line thereto, means responsive to such seizure for seizing an idle director, a relay in said second selector operated responsive to said last named seizure for extending said calling line to said director and transferring the control of said second selector from said calling line to said director, said director being normally responsive to the second digit of the dialled call number for operating said second selector in its vertical movement, said selector then rotating automatically to hunt an idle trunk and said second selector being operated in its vertical movement direct from the calling line in response to said second digit in case said second digit is dialled before said relay has operated, and means responsive to said last named vertical movement for disabling said relay and for causing said second selector to rotate automatically to its 11th position to operate a busy signal.

22. In a telephone system having a plurality of exchanges connected together in tandem including a central exchange with two adjacent exchanges one on either side thereof and other exchanges beyond said adjacent exchanges, a switch train in each said exchange, directors in all of said exchanges except said central exchange, means including said switch trains and said directors for directing calls from any of said director exchanges to any other of said exchanges in response to the dialling of an invariable number of office selecting digits, means including said switch train alone for directing calls from said central exchange to any other of said exchanges in response to the dialling of the same office digits, and drop back selectors in said adjacent exchanges for absorbing one of said digits in case such digit corresponds to such adjacent exchange, to direct the call to such adjacent exchange.

23. In a telephone system, outgoing trunks, a second selector having access to said trunks, a calling line, a first selector, a call director, means for seizing said second selector through said first selector in response to the first digit of a call number dialled from said calling line to said first selector, circuits operated in response to such seizure for seizing said director and transferring the control of said second selector to said director, circuits operated responsive to the dialling of the second digit of the call number following said last seizure for causing said director to operate said second selector to seize one of said trunks, circuits operated responsive to said second digit being dialled before the seizure of said director has been effected for operating said second selector direct from said calling line in response to said second digit, and circuits operated in response to said last operation of said second selector for blocking the selection of a trunk thereby and preventing the seizure of said director.

IMRE MOLNAR.

REFERENCES CITED

The following references are of record in the file of this patent:

UNITED STATES PATENTS

| Number | Name | Date |
|---|---|---|
| 1,283,182 | Hershey | Oct. 29, 1918 |
| 1,541,388 | Polinkowsky | June 9, 1925 |
| 1,589,402 | Kopp | June 22, 1926 |
| 1,638,331 | Gardner | Aug. 9, 1927 |
| 1,646,262 | Schwartz | Oct. 18, 1927 |
| 1,732,185 | Stehlik | Oct. 15, 1929 |
| 1,808,574 | Richardson | June 2, 1931 |
| 1,848,399 | Turney | Mar. 8, 1932 |
| 1,859,905 | Wicks | May 24, 1932 |
| 1,922,232 | Christian | Aug. 15, 1933 |
| 2,006,438 | Carpenter | July 2, 1935 |
| 2,030,419 | Williams | Feb. 11, 1936 |
| 2,187,784 | Hersey | Jan. 23, 1940 |